United States Patent

Nagase et al.

[11] Patent Number: 5,972,272
[45] Date of Patent: Oct. 26, 1999

[54] UNSATURATED POLYESTER RESIN COMPOSITION AND PROCESS FOR MOLDING THE COMPOSITION

[75] Inventors: Toshio Nagase, Kawasaki; Takeo Kobayashi, Tokyo; Atsushi Tsukamoto, Kawasaki, all of Japan

[73] Assignee: Nippon Zeon Co., Ltd., Tokyo, Japan

[21] Appl. No.: 08/765,326

[22] PCT Filed: Jun. 29, 1995

[86] PCT No.: PCT/JP95/01300

§ 371 Date: Dec. 26, 1996

§ 102(e) Date: Dec. 26, 1996

[87] PCT Pub. No.: WO96/00753

PCT Pub. Date: Jan. 11, 1996

[30] Foreign Application Priority Data

Jun. 30, 1994 [JP] Japan .................................. 6/171636
Sep. 29, 1994 [JP] Japan .................................. 6/259266
Dec. 27, 1994 [JP] Japan .................................. 6/337961
Mar. 31, 1995 [JP] Japan .................................. 7/100704

[51] Int. Cl.$^6$ .............................. C08L 67/06; C08J 3/24; C08J 5/24
[52] U.S. Cl. ..................... 264/324; 264/320; 264/328.2; 264/331.18; 523/522; 523/523; 523/526; 525/64; 525/168; 525/170
[58] Field of Search ............................. 525/64, 168, 170; 264/320, 324, 331.18, 328.2; 523/522, 523, 526

[56] References Cited

U.S. PATENT DOCUMENTS 4,230,813  10/1980  Cooke ..................................... 525/170
5,362,804  11/1994  Oshima .................................... 525/64

FOREIGN PATENT DOCUMENTS 484 019    6/1992  European Pat. Off. .
05171023   7/1993  Japan .
05171022   9/1993  Japan .

OTHER PUBLICATIONS

Ching–Chih Lee et al., "Simulation of Compression Molding for Fiber–Reinforced Thermosetting Polymers" Transactions of the ASME Journal of Engineering for Industry, vol. 1106, May 1984, pp. 114,–125, XP–002081728.

*Primary Examiner*—Patricia A. Short
*Attorney, Agent, or Firm*—Armstrong, Westerman, Hattori, McLeland & Naughton

[57] ABSTRACT

An unsaturated polyester resin composition for molding comprising (A) an unsaturated polyester resin, (B) a thickening agent containing powder of a thermoplastic resin as the effective component thereof in an amount of 20 to 120 parts by weight per 100 parts by weight of the unsaturated polyester resin, (C) a liquid polymerizable monomer in an amount of 30 to 120 parts by weight per 100 parts by weight of the unsaturated polyester resin, and (D) a curing agent; SMC and BMC prepared by adding (E) a reinforcing material to the composition; and a process for molding the SMC and the BMC at a low temperature under a low pressure. The unsaturated polyester resin composition of the present invention can be converted into SMC in a short time. The obtained SMC has an excellent storage stability, can be molded at a low temperature under a low pressure, and provides a molded product exhibiting low shrinkage, excellent surface smoothness, a large strength, and a large modulus.

17 Claims, 2 Drawing Sheets

UNSATURATED POLYESTER RESIN COMPOSITION AND PROCESS FOR MOLDING THE COMPOSITION

TECHNICAL FIELD

The present invention relates to a novel unsaturated polyester resin composition and a process for molding the composition. More particularly, the present invention relates to an unsaturated polyester resin composition which shows a low shrinkage, can be made into a sheet molding compound (hereinafter, referred to as SMC) or a bulk molding compound (hereinafter, referred to an BMC) by thickening in a short time, provides a compound which shows suppressed increase in the viscosity afer the viscosity has been increased to a value sufficient for preparation of an SMC or a BMC, i.e. a compound having an excellent storage stability, enables molding of the compound at a low temperature under a low pressure, and provides a molded product having a large strength and a low modulus.

BACKGROUND ART

In recent years, the demand for SMC and BMC prepared by using unsaturated polyester resins as the base material have steadily been increasing in the processing industry of reinforced plastics as novel industrial materials for machine molding satisfying the requirements of labor saving, mass production, and improvements in thw working environment.

SMC stands generally for a sheet material prepared as follows: an oxide or a hydroxide of an alkaline earth metal used as a thickening agent (an agent for preparation of a sheet) is added to a fluid dispersion obtained by mixing an unsaturated polyester resin, a liquid polymerizable monomer, a curing agent, an inorganic filler, a mold release agent, a flame retardant, a pigment, and the like; a fluid composition is prepared by adding a reinforcing material, such as glass fiber, to the obtained fluid dispersion in an amount of 20 to 50 parts by weight per 100 parts by weight of the fluid dispersion in order to provide the fluid composition with toughness; the prepared fluid composition is sandwiched between release films; thickening of the fluid composition is allowed to take place by reaction for several days; and the resultant fluid composition is formed into a sheet.

The sheet prepared in the above is transferred to the place for molding and molded by heating in a mold to obtain a molded product having a finished shape. The molding is generally conducted by pressing the sheet under a condition of a high temperature and a high pressure, such as a temperature of 100 to 180° C. and a pressure of 30 to 100 kgf/cm$^2$ (gauge).

Because shrinkage of about 7 to 10% by volume takes place with the molded product obtained by the pressing of the sheet, addition of a thermoplastic resin as a low shrinkage agent is generally conducted for improving the shrinkage (Japanese Patent Publication Showa 46(1971)-14541, Japanese Patent Application Laid-Open No. Heisei 6(1994)-32809, and like others).

Although the technology for molding has been improved by the above process, and unsaturated polyester resins have increasingly been used, unsaturated polyester resins have not widely been used for articles produced in small numbers because molds which are durable under a high pressure are expensive, and other facilities for high temperatures and high pressures are necessary.

Thus, development of an unsaturated polyester resin composition for SMC which is easily processed in molding at a low temperature (40 to 100° C.) and/or under a low pressure (0.1 to 10 kgf/cm$^2$), even under a vacuum, has been desired.

In particular, when the molding is conducted at a low temperature, a curing agent of a low temperature decomposition type must be adopted. When the molding is conducted under a low pressure, the molding must be conducted while the viscosity of SMC during heating is decreased by adjusting the formulation of the compound, for example, by decreasing the added amount of a metal oxide or an inorganic hydroxide which is mixed as a filler or as a flame retardant or by decreasing the mixed amount of glass fiber which is used as a reinforcing material.

However, when the SMC described above which can be molded at a low temperature is prepared, it is necessary that a curing agent having a low decomposition temperature be added, and this curing agent tends to have a shorter period for service at a room temperature because reaction takes place with an oxide of an alkaline earth metal or the like which is used for increasing the viscosity of the composition to facilitate the preparation of the SMC. Therefore, it is necessary that procedures including the press molding be conducted within a short time or the SMC be stored at a low temperature. When the amount of an oxide of an alkaline earth metal or the like is decreased in order to solve the above problem, various problems in the low pressure molding arise as described in the following.

When the low pressure molding is conducted, it is necessary that the added amount of an alkaline earth metal or the like be decreased in order to facilitate flow of the unsaturated polyester resin composition. However, the decrease in the above amount causes insufficient increase in the viscosity of the SMC itself, and cleavage of the release film used for sandwiching the SMC sheet becomes unsatisfactory. This requires a complicated operation in which the SMC sheet is molded while the release sheets are still attached thereto and the release films are removed from the molded product after the molding. Moreover, because the molding is conducted while the release sheets are still attached to the SMC sheet, molding of a thick article by using a laminate of a plurality of SMC sheets is difficult. As still another problem, when an oxide of an alkaline earth metal is present even in a small amount, the reaction with a curing agent continues to proceed slowly at a room temperature to cause decrease in the storage stability of SMC, and the period for service is inevitably limited. As still another problem, when the amount of glass fiber added to the compound is decreased in order to adjust the viscosity, strength of the obtained molded product is decreased.

In the conventional method for increasing the viscosity by using an oxide of an alkaline earth metal as the thickening agent, the thickening agent and the unsaturated polyester resin are brought into a crosslinking reaction while decomposition of the curing agent is avoided. Therefore, a treatment at a room temperature or a treatment by heating at a low temperature is required, and it generally takes several days for increasing the viscosity to a prescribed value. Thus, development of a process for preparation of SMC in a short time has been desired.

Under the circumstances described above, the present invention has an object of providing an unsaturated polyester resin composition which enables preparation of SMC in a short time and provides SMC having an excellent storage stability, showing no problem on cleavage of release films, and enabling molding at a low temperature under a low pressure and another object of providing a process for molding the composition.

DISCLOSURE OF THE INVENTION

As the result of extensive studies conducted by the present inventors to develop the unsaturated polyester resin composition having the above desirable properties, it was discovered that the above objects can be achieved by a composition showing a specific viscosity behavior which is obtained by using fine powder of a specific thermoplastic resin having a composition and a particle diameter which provide an excellent viscosity for molding in place of an oxide of an alkaline earth metal or the like which has conventionally been used, and by mixing the fine powder with the unsaturated polyester resin in combination with a liquid polymerizable monomer and a curing agent. The present invention has been completed on the basis of the discovery.

Accordingly, the present invention provides:

(1) An unsaturated polyester resin composition for molding comprising (A) an unsaturated polyester resin, (B) a thickening agent containing powder of a thermoplastic resin as the effective component thereof in an amount of 20 to 120 parts by weight per 100 parts by weight of the unsaturated polyester resin, (C) a liquid polymerizable monomer in an amount of 30 to 120 parts by weight per 100 parts by weight of the unsaturated polyester resin, and (D) a curing agent;

(2) An unsaturated polyester resin composition for molding described in (1) wherein the thickening agent containing powder of a thermoplastic resin as the effective component thereof is a thickening agent containing, as the effective component thereof, powder of a resin containing 50% by weight or more of at least one type of monomer unit selected from the group consisting of esters of acrylic acid, esters of methacrylic acid, and aromatic vinyl compounds;

(3) An unsaturated polyester resin composition for molding described in (1) wherein the thickening agent containing powder of a thermoplastic resin as the effective component thereof is a thickening agent containing, as the effective component thereof, powder of a copolymer resin prepared by ionically crosslinking particles of a core/shell copolymer by addition of a metal cation, the core/shell copolymer being constituted with (a) a core which comprises a polymer of an ester of acrylic acid or an ester of methacrylic acid having a glass transition temperature of −30° C. or lower and/or a polymer of a diene having a glass transition temperature of −30° C. or lower and (b) a shell which comprises a copolymer of a monomer of an ester of acrylic acid or an ester of methacrylic acid and a monomer of a radical polymerizable unsaturated carboxylic acid having free carboxyl group and has a glass transition temperature of 70° C. or higher;

(4) An unsaturated polyester resin molding material comprising (A) an unsaturated polyester resin, (B) a thickening agent containing powder of a thermoplastic resin as the effective component thereof in an amount of 20 to 120 parts by weight per 100 parts by weight of the unsaturated polyester resin, (C) a liquid polymerizable monomer in an amount of 30 to 120 parts by weight per 100 parts by weight of the unsaturated polyester resin, (D) a curing agent, and (E) a reinforcing material;

(5) An unsaturated polyester resin molding material described in (4) wherein the thickening agent containing powder of a thermoplastic resin as the effective component thereof contains 50% by weight or more of at least one type of monomer unit selected from the group consisting of esters of acrylic acid, esters of methacrylic acid, and aromatic vinyl compounds;

(6) An unsaturated polyester resin molding material described in (4) wherein the thickening agent containing powder of a thermoplastic resin as the effective component thereof is a thickening agent containing, as the effective component thereof, powder of a copolymer resin prepared by ionically crosslinking particles of a core/shell copolymer by addition of a metal cation, the core/shell copolymer being constituted with (a) a core which comprises a polymer of an ester of acrylic acid or an ester of methacrylic acid having a glass transition temperature of −30° C. or lower and/or a polymer of a diene having a glass transition temperature of −30° C. or lower and (b) a shell which comprises a copolymer of a monomer of an ester of acrylic acid or an ester of methacrylic acid and a monomer of a radical polymerizable unsaturated carboxylic acid having free carboxyl group and has a glass transition temperature of 70° C. or higher;

(7) A sheet molding compound comprising the unsaturated polyester resin molding material described in any of (4) to (6) and having a thickness of 0.3 to 5 mm;

(8) A sheet molding compound described in (7) wherein both sides of the sheet are covered with a release film;

(9) A process for producing a sheet molding compound of an unsaturated polyester resin comprising coating one or both of two release films with the unsaturated polyester resin composition for molding described in any of (1) to (3), spreading (E) a reinforcing material on the coated release films, bringing the two release films attached to each other in such a manner that the coated sides are placed between the two release films, and rolling the obtained laminate;

(10) A process for producing a sheet molding compound of an unsaturated polyester resin comprising coating one or both of two release films with a mixture containing (A) an unsaturated polyester resin, (C) a liquid polymerizable monomer, and (D) a curing agent, spreading (B) a thickening agent containing powder of a thermoplastic resin as the effective component thereof and (E) a reinforcing material on the coated release films, bringing the two release films attached to each other in such a manner that the coated sides are placed between the two release films, and rolling the obtained laminate;

(11) A process for producing a sheet molding compound of an unsaturated polyester resin described in (10) wherein the thickening agent containing powder of a thermoplastic resin as the effective component thereof is a thickening agent containing, as the effective component thereof, powder of a resin containing 50% by weight or more of at least one type of monomer selected from the group consisting of esters of acrylic acid, esters of methacrylic acid, and aromatic vinyl compounds;

(12) A process for producing a sheet molding compound of an unsaturated polyester resin described in (10) wherein the thickening agent containing powder of a thermoplastic resin as the effective component thereof is a thickening agent containing, as the effective component thereof, powder of a copolymer resin prepared by ionically crosslinking particles of a core/shell copolymer by addition of a metal cation, the core/shell copolymer being constituted with (a) a core which comprises a polymer of an ester of acrylic acid or an ester of methacrylic acid having a glass transition temperature of −30° C. or lower and/or a polymer of a diene having a glass transition temperature of −30° C. or lower and (b) a shell which comprises a copolymer of a monomer of an ester of acrylic acid or an ester of methacrylic acid and a monomer of a radical polymerizable unsaturated carboxylic acid having free carboxyl group and has a glass transition temperature of 70° C. or higher;

(13) A process for molding an unsaturated polyester resin molding material comprising placing the sheet molding compound described in (7) into a mold and compression molding the sheet molding compound at 40 to 100° C. under 0.1 to 10 kgf/cm² (gauge pressure) to obtain a molded product;

(14) A process for molding an unsaturated polyester resin molding material comprising placing the sheet molding compound described in (7) into a mold, bringing the sheet molding compound tightly attached to the surface of the mold under −760 to −50 mmHg, and subsequently or simultaneously heating the sheet molding compound to 50 to 150° C. to obtain a molded product;

(15) A process for molding an unsaturated polyester resin molding material comprising placing the sheet molding compound described in (7) into a mold, bringing the sheet molding compound tightly attached to the surface of the mold by application of an air pressure of 1 to 5 kgf/cm² (gauge pressure), and subsequently or simultaneously heating the sheet molding compound to 50 to 150° C. to obtain a molded product;

(16) A process for molding an unsaturated polyester resin molding material comprising placing 2 to 10 sheets of the sheet molding compound described in (7) into a mold to form a laminate and compression molding the laminate at 40 to 100° C. under 0.1 to 10 kg/cm² (gauge pressure) to obtain a molded product;

(17) A process for molding an unsaturated polyester resin molding material comprising placing 2 to 10 sheets of the sheet molding compound described in 97) into a mold to form a laminate, bringing the laminate tightly attached to the surface of the mold under −760 to −50 mmHg, and subsequently or simultaneously heating the laminate to 50 to 150° C. to obtain a molded product;

(18) A process for molding an unsaturated polyester resin molding material comprising placing 2 to 10 sheets of the sheet molding compound described in (7) into a mold to form a laminate, bringing the laminate tightly attached to the surface of the mold by application of an air pressure of 1 to 5 kgf/cm² (gauge pressure), and subsequently or simultaneously heating the laminate to 50 to 150° C. to obtain a molded product;

(19) A bulk molding compound comprising an unsaturated polyester resin molding material described in any of (4) to (6) and having a size of 0.5 to 50 cm;

(20) A bulk molding compound described in (19) wherein the bulk molding compound is covered with a release film;

(21) A process for molding an unsaturated polyester resin molding material comprising placing the bulk molding compound described in (19) into a mold and compression molding the bulk molding compound at 40 to 100° C. under 0.1 to 10 kgf/cm² (gauge pressure) to obtain a molded product;

(22) A process for molding an unsaturated polyester resin molding material comprising softening the bulk molding compound described in (19) in a transfer pot at 50 to 150° C. and molding the softened bulk molding compound by compressing into a cavity heated to 50 to 150° C. under 1 to 20 kgf/cm² (gauge pressure) to obtain a molded product;

(23) A process for molding an unsaturated polyester resin molding material comprising injection molding the bulk molding compound described in (19) at 50 to 150° C. under 1 to 20 kgf/cm² (gauge) to obtain a molded product;

(24) A thickening agent which is added to an unsaturated polyester resin composition comprising (A) an unsaturated polyester resin, (C) a liquid polymerizable monomer, and (D) a curing agent and comprises, as the effective component thereof, powder of a thermoplastic resin having function of converting the unsaturated polyester resin composition into a gel form by absorbing the liquid component;

(25) A thickening agent comprising powder of a thermoplastic resin as the effective component thereof described in (24) wherein the powder of a thermoplastic resin has an average diameter of single particles of 0.2 to 40 μm;

(26) A thickening agent comprising powder of a thermoplastic resin as the effective component thereof according to any of (24) and (25) wherein the powder of a thermoplastic resin contains 50% by weight or more of at least one type of monomer unit selected from esters of acrylic acid, esters of methacrylic acid, and aromatic vinyl compounds;

(27) A thickening agent comprising powder of a thermoplastic resin as the effective component thereof according to any of (24) and (25) wherein the powder of a thermoplastic resin is powder of a copolymer resin prepared by ionically crosslinking particles of a core/shell copolymer by addition of a metal cation, the core/shell copolymer being constituted with (a) a core which comprises a polymer of an ester of acrylic acid or an ester of methacrylic acid having a glass transition temperature of −30° C. or lower and/or a polymer of a diene having a glass transition temperature of −30° C. or lower and (b) a shell which comprises a copolymer of a monomer of an ester of acrylic acid or an ester of methacrylic acid and a monomer of a radical polymerizable unsaturated carboxylic acid having free carboxyl group and has a glass transition temperature of 70° C. or higher;

(28) A process for increasing viscosity of an unsaturated polyester resin composition comprising conducting pseudo-curing of an unsaturated polyester resin composition comprising (A) an unsaturated polyester resin, (C) a liquid polymerizable monomer, and (D) a curing agent by adding (B) a thickening agent containing powder of a thermoplastic resin as the effective component thereof;

(29) A process for increasing viscosity of an unsaturated polyester resin composition described in (28) wherein the thickening agent containing powder of a thermoplastic resin as the effective component thereof contains 50% by weight or more of at least one type of monomer unit selected from the group consisting of esters of acrylic acid, esters of methacrylic acid, and aromatic vinyl compounds;

(30) A process for increasing viscosity of an unsaturated polyester resin composition described in (28) wherein the thickening agent containing powder of a thermoplastic resin as the effective component thereof is powder of a copolymer resin prepared by ionically crosslinking particles of a core/shell copolymer by addition of a metal cation, the core/shell copolymer being constituted with (a) a core which comprises a polymer of an ester of acrylic acid or an ester of methacrylic acid having a glass transition temperature of −30° C. or lower and/or a polymer of a diene having a glass transition temperature of −30° C. or lower and (b) a shell which comprises a copolymer of a monomer of an ester of acrylic acid or an ester of methacrylic acid and a monomer of a radical polymerizable unsaturated carboxylic acid having free carboxyl group and has a glass transition temperature of 70° C. or higher; and

(31) An unsaturated polyester resin composition for molding comprising (A) an unsaturated polyester resin, (B) a thickening agent containing powder of a thermoplastic resin as the effective component thereof, (C) a liquid monomer, and (D) a curing agent, wherein viscosity of a mixture containing component (A), component (B), and component (C) is 2,000,000 cps or higher at 25° V and 5,000 to 100,000 cps at 80° C.

Figure 1:
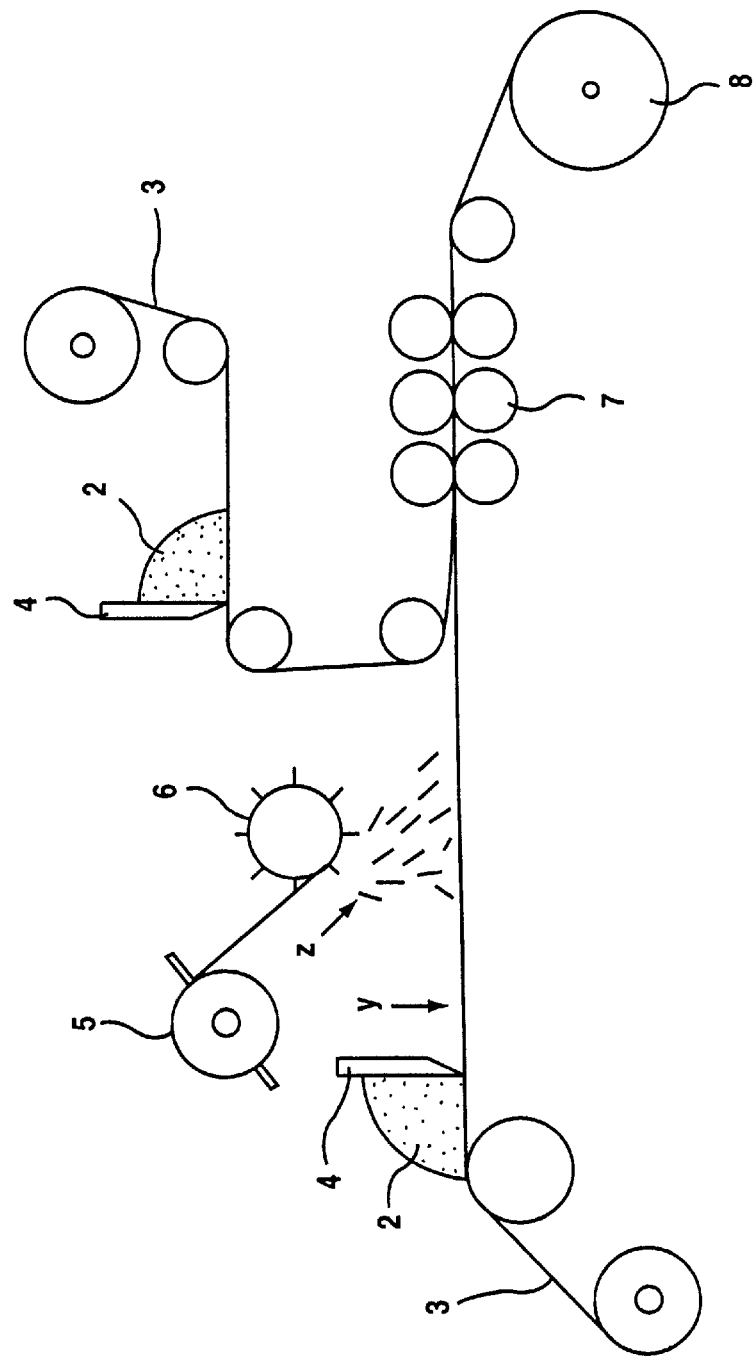
FIG. 1 shows a schematic diagram illustrating the process for producing SMC.

In the figures, 1 is a mixer, 2 is a mixture, 3 is a release film, 4 is a coater, 5 is a reinforcing material, 6 is a chopper, 7 is a roll, 8 is a winding roller, 9 is a mold for a vessel, 10 is SMC, 11 is a polypropylene film, and 12 is a pressure-sensitive rubber adhesive.

THE MOST PREFERRED EMBODIMENT TO CARRY OUT THE INVENTION

In the composition of the present invention, the unsaturated polyester resin used as component (A) is not particularly limited, and a conventional unsaturated polyester resin which is heretofore used for a conventional molded product of an unsaturated polyester resin can be used. The unsaturated polyester resin is obtained from an $\alpha,\beta$-unsaturated carboxylic acid or, occasionally, an $\alpha,\beta$-unsaturated carboxylic acid containing a saturated carboxylic acid and an alcohol.

Examples of the $\alpha,\beta$-unsaturated carboxylic acid include fumaric acid, maleic acid, maleic anhydride, itaconic acid, citraconic acid, mesaconic acid, chloromaleic acid, and dimethyl esters of these acids. The above $\alpha,\beta$-unsaturated carboxylic acids may be used singly or as a combination of two or more types. Examples of the saturated carboxylic acid include phthalic acid, phthalic anhydride, isophthalic acid, terephthalic acid, het acid, hexahydrophthalic anhydride, adipic acid, sebacic acid, and azelaic acid. The above saturated carboxylic acids may be used singly or as a combination of two or more types.

Examples of the alcohol include diols, such as ethylene glycol, diethylene glycol, propylene glycol, dipropylene glycol, trimethylene glycol, 1,3-butanediol, 1,4-butanediol, 1,3-pentanediol, 1,6-hexanediol, cyclohexanediol, neopentyl glycol, 2,2,4-trimethyl-1,3-pentanediol, glycerol monoallyl ether, hydrogenated bisphenol A, 2,2-bis(4-hydroxypropoxyphenyl)propane, and 2,2-bis(4-hydroxyethoxyphenyl)propane; triols, such as trimethylolpropane; and tetraols, such as pentaerythritol. The above alcohols may be used singly or as a combination of two or more types.

When an oxide of an alkaline earth metal which has conventionally been used as the agent for preparation of SMC (the thickening agent) is used, it is necessary that the molecular weight of the unsaturated polyester resin of component (A) be about 2,500 or higher. In contrast, when the agent for preparation of SMC of the present invention which comprises powder of a thermoplastic resin as the effective component thereof is used, it is possible that even an unsaturated polyester resin having a molecular weight of 1,000 to 2,500 is used for the preparation of SMC. As the result, the SMC has an excellent flow property during heat molding, and molding at a low pressure is made possible.

In the present invention, a part of the unsaturated polyester resin of component (A) may occasionally be replaced with an epoxy acrylate resin in order to improve chemical resistance or with a urethane acrylate resin in order to improve adhesion in the insert processing. Examples of the epoxy acrylate resin used for the above purpose include resins prepared by addition of acrylic acid or methacrylic acid to epoxy resins of the bisphenol A type, epoxy resins of the bisphenol F type, epoxy resins of the bisphenol S type, and epoxy resins of the novolak type. Examples of the urethane acrylic resin include resins prepared by addition of tolylene diisocyanate to both ends of ethylene glycol, followed by addition of 2-hydroxyethyl methacrylate to both ends of the resultant compound, which are disclosed in Japanese Patent Publication Showa 55(1980)-30527, Japanese Patent Publication Showa 60(1985)-26132, and Japanese Patent Publication Showa 60(1985)-26133.

The above unsaturated polyester resin is generally used in the condition that the resin is dissolved in the liquid polymerizable monomer of component (C).

In the composition of the present invention, it is preferred that powder of a resin containing 50% by weight or more of at least one monomer unit selected from esters of acrylic acid, esters of methacrylic acid, and aromatic vinyl compounds is used as component (B). Examples of the ester of acrylic acid used as the material monomer for the powder of the resin include methyl acrylate, ethyl acrylate, n-propyl acrylate, isopropyl acrylate, n-butyl acrylate, isobutyl acrylate, sec-butyl acrylate, t-butyl acrylate, n-hexyl acrylate, cycohexyl acrylate, 2-ethylhexyl acrylate, and n-octyl acrylate. Examples of the ester of methacrylic acid include methyl methacrylate, ethyl methacrylate, n-propyl methacrylate, isopropyl methacrylate, n-butyl methacrylate, n-hexyl methacrylate, cycohexyl methacrylate, 2-ethylhexyl methacrylate, and n-octyl methacrylate. Among these compounds, methyl methacrylate is particularly preferable.

Examples of the aromatic vinyl compound include styrene, $\alpha$-methylstyrene, divinylbenzene, and compounds obtained by incorporation of a substituent, such as methyl group, ethyl group, propyl group, and butyl group, into the benzene ring of these compounds, such as vinyltoluene and isopropylstyrene.

The above monomers may be used singly or as a combination of two or more types. It is preferred that the content of the above monomer unit is 50% by weight or more. When the content is less than 50% by weight, there is the possibility that the object of the present invention is not sufficiently achieved.

In the powder of the resin as component (B), other copolymerizable monomer units may be contained in an amount of less than 50% by weight. Examples of the other copolymerizable monomer include cyanovinyl compounds, such as acrylonitrile and methacrylonitrile; vinyl esters, such as vinyl acetate, vinyl propionate, vinyl myristate, vinyl oleate, and vinyl benzoate; unsaturated monocarboxylic acids, such as acrylic acid, methacrylic acid, 2-ethylpropenic acid, crotonic acid, and cinnamic acid; unsaturated dicarboxylic acids, such as maleic acid, itaconic acid, fumaric acid, citraconic acid, and chloromaleic acid; monoesters of unsaturated dicarboxylic acids, such as monomethyl maleate, monoethyl maleate, and monobutyl itaconate; conjugated dienes, such as butadiene, isoprene, 1,3-pentadiene, and cyclopentadiene; and non-conjugated dienes, such as 1,4-hexadiene, dicyclopentadiene, and ethylidenenorbornene. In order to adjust the solubility of the above resin when the resin is used as the thickening agent in the process for preparation of SMC from an unsaturated polyester resin composition, the polymer constituting the resin may suitably be crosslinked. As the copolymer component for the crosslinking, for example, monomers such as glycidyl (meth)acrylate, 3,4-epoxycyclohexyl (meth)acrylate, 2-aminoethyl (meth)acrylate, 3-aminopropyl (meth) acrylate, 2-aminobutyl (meth)acrylate, (meth)acrylamide, N-2-aminoethyl(meth)acrylamide, N-2-aminopropyl(meth) acrylamide, N-3-aminopropyl(meth)acrylamide, polyethylene glycol dimethacrylates having 1 to 14 ethylene groups, trimethylolpropane trimethacrylate, triallyl trimellitate, diallyl phthalate, allyl glycidyl ether, and triallyl isocyanurate, can be used.

For the purpose of suppressing increase in the viscosity of the composition of the present invention with time, an ionic crosslinking may be formed between the polymers at the surface of the particles of the resin. In the ionic crosslinking, a metal cation is added to resin particles having a polymer containing carboxyl groups at the surface thereof to form the crosslinking between the carboxyl groups. The ionic crosslinking has the function of suppressing penetration of a solvent into the particles of the resin. At a high temperature, the ionic crosslinking is dissociated by the molecular motion unlike the crosslinking by a covalent bond, and the polymer exhibits the behavior of a polymer having no crosslinking during the molding.

The other copolymerizable monomers described above may be used singly or as a combination of two or more types.

The powder of the resin as component (B) is used as the thickening agent in the preparation of SMC. When the powder of the resin is mixed with the liquid polymerizable monomer of component (C), the powder of the resin absorbs component (C) to form a swelled material so that the unsaturated polyester resin composition exhibits a controlled and excellent viscosity for processing within a specific range of temperature which is 50° C. or lower. For exhibiting the expected effect, it is preferred that the powder of the resin has a suitable particle diameter and a suitable condition of the surface of the particles in addition to the preferably selected composition.

As for the particle diameter, the average diameter of single particles is preferably in the range of 0.2 to 40 $\mu$m, more preferably in the range of 0.5 to 15 $\mu$m. When the average diameter of single particles is less than 0.2 $\mu$m, the particles are excessively fine, and the rate of absorption of the liquid polymerizable monomer of component (C) is large at a room temperature. Because of the resultant excessively high viscosity, mixing of glass fiber or the like becomes difficult. When the average diameter of single particles is more than 40 $\mu$m, the rate of absorption of the liquid polymerizable monomer at a room temperature is small, and pseudo-curing becomes slow. Therefore, the preparation of SMC becomes difficult when glass fiber is not added as the reinforcing agent. The pseudo-curing means the property of forming a gel by absorbing a liquid component and forming a swelled material. However, when SMC containing 30 parts by weight or more of a reinforcing material such as glass fiber or the like per 100 parts by weight of component (A) is prepared, glass fiber or the like cannot uniformly be incorporated because of the fast increase in the viscosity unless the overall viscosity is adjusted to a lower value. In this case, a powder of a resin having an average diameter of single particles of 1 to 40 $\mu$m is preferable as component (B). For realizing the increase in the viscosity to the above value suitable for SMC after glass fiber or the like has been added, it is more preferred that a component having a smaller particle diameter, such as a particle diameter of about 0.2 to 5 $\mu$m, is used in combination with a powder of a resin having a particle diameter, for example, of about 50 $\mu$m, and the overall weight-average value of the particle diameters is brought within the range of 1 to 40 $\mu$m. As the shape of the particles of the powder of the resin, a spherical shape is preferable. When particles having an irregular shape or a porous shape are mixed, the particles can be mixed only in a small amount because the viscosity is increased. The preparation of SMC becomes difficult when the particles are mixed only in a small amount because the obtained mixture has tackiness and does not show the pseudo-curing phenomenon. As for the condition of the surface of the particles, a smooth surface is preferred to a porous surface in view of the control of the viscosity by the same reason as that described above. The effect of thickening is occasionally varied depending on the type and the amount of surfactants and dispersants which are used as auxiliary materials and attached to the surface by spray drying or the like process.

As for the degree of absorption of and swelling with the liquid polymerizable monomer which the powder of the thermoplastic resin as component (B) must achieve, it is preferred that the degree is decided in such a manner that the unsaturated polyester resin composition can exhibit a specific viscosity and a specific storage stability. In other words, it is preferred that the composition of the present invention has a viscosity (measured at 25° C.) of 1,000,000 to 50,000,000 cps at the time when 24 hours has passed at 40° C. after the preparation of the composition and, at the time when 30 days has passed at 30° C. after the preparation of the composition, a viscosity 5 times or less as large as the above viscosity measured at the time when 24 hours has passed at 40° C. (measured at 25° C.). When the viscosity (measured at 25° C.) at the time when 24 hours has passed at 40° C. after the preparation of the composition is at the outside of the above range, the preparation of SMC is difficult. When the above viscosity measured at the time when 30 days has passed is more than 5 times as large as the above viscosity measured at the time when 24 hours has passed, the storage stability of the sheet of SMC is inferior, and the flexibility is decreased to cause difficulty in handling and molding of the SMC at a time long after the preparation. When the viscosity is measured, a sample of the composition is left standing in a chamber kept at a constant temperature of 25° C. for 1 hour, and then the viscosity is measured in an atmosphere of a temperature of 25° C. and a relative humidity of 60%.

When a powder of a thermoplastic resin as component (B) simply absorbs the liquid polymerizable monomer and is not swelled or is swelled only to a small degree by the absorption, the powder of a thermoplastic resin is not preferable as component (B) because the viscosity of a composition containing such a powder is decreased and does not show the value specified above.

The powder of the thermoplastic resin as component (B) preferably has a weight-average molecular weight in the range of 1,000 to 150,000. When the weight-average molecular weight is at the outside of this range, preparation of an SMC having the above viscosity behavior is difficult.

When the above crosslinking monomer is added to the powder of the resin and polymerized, and the degree of crosslinking of the obtained powder of the resin is excessively high, the time required for the preparation of a sheet of SMC is increased. It is preferred that the powder of a resin is crosslinked to a degree which leads to formation of 50% by weight or less of the insoluble gel fraction when the powder of the resin is dissolved in a solvent.

The process for producing the above powder of the resin is not particularly limited, and processes conventionally used for production of fine powder of a resin, such as polyvinyl chloride and polymethyl methacrylate, can be adopted. For example, the fine suspension polymerization, the emulsion polymerization, the seeded emulsion polymerization, or the suspension polymerization can be adopted. Among these processes, a process producing particles of a polymer which are not excessively fine and have a spherical shape is preferable.

For example, in a preferred process of the fine suspension polymerization, an initiator soluble in oils is used as the radical initiator. The diameter of liquid droplets is adjusted by a treatment to make the diameter of oil droplets of the monomer uniform in advance before initiation of the polymerization, and then the polymerization is conducted to produce uniformly dispersed fine polymer particles.

As the initiator soluble in oils, for example, diacyl peroxides, such as dibenzoyl peroxide, di-3,5,5-trimethylhexanoyl peroxide, and dilauroyl peroxide; peroxydicarbonates, such as diisopropyl peroxydicarbonate, di-sec-butyl peroxydicarbonate, and di-2-ethylhexyl peroxydicarbonate; peroxyesters, such as t-butyl peroxypivalate and t-butyl peroxyneodecanoate; organic peroxides, such as acetylcylohexyl sulfonyl peroxide and disuccinic acid peroxide; and azo compounds, such as 2,2'-azobisisobutyronitrile, 2,2'-azobis-2-methylbutyronitrile, and 2,2'-azobisdimethylvaleronitrile, can be used. The above catalysts may be used singly or as a combination of two or more types. The used amount is suitably selected in accordance with the type and the amount of the monomer and the method of addition of the components. The amount is generally selected in the range of 0.001 to 5.0 parts by weight per 100 parts by weight of the used monomer.

In the fine suspension polymerization and the suspension polymerization, surfactants and dispersants are generally used. Examples of the surfactant include alkyl ester salts of sulfuric acid, such as sodium lauryl sulfate and sodium myristyl sulfate; salts of alkylarylsulfonic acid, such as sodium dodecylbenzenesulfonate and potassium dodecylbenzenesulfonate; ester salts of sulfosuccinic acid, such as sodium dioctyl sulfosuccinate and sodium dihexyl sulfosuccinate; salts of fatty acids, such as ammonium laurate and potassium stearate; anionic surfactants, such as ester salts of polyoxyethylene alkylsulfuric acids, ester salts of polyoxyethylene alkylarylsulfuric acids, and sodium dodecyl diphenyl ether disulfonate; sorbitan esters, such as sorbitan monooleate and polyoxyethylene-sorbitan monostearate; nonionic surfactants, such as polyoxyethylene alkyl ethers and polyoxyethylene alkylphenyl ethers; and cationic surfactants, such as cetylpyridinium chloride and cetyltrimethyl-ammonium bromide. Examples of the dispersant include polyvinyl alcohol, methylcellulose, and polyvinylpyrrolidone. The surfactants and the dispersants described above may be used singly or as a combination of two or more types. The used amount is suitably selected generally in the range of 0.05 to 5 parts by weight, preferably 0.2 to 4.0 parts by weight, per 100 parts by weight of the used monomer.

For example, in the case of the fine suspension polymerization, the above catalyst soluble in oils, a monomer, the above surfactant, polymerization auxiliary agents, such as a higher fatty acid and a higher alcohol, which are optionally used, and other additives are added to an aqueous medium, and the components are premixed. Then, the premixed components are treated for homogenization by using a homogenizer to adjust the particle diameter of oil droplets. Examples of the homogenizer include a colloid mill, a vibrating stirrer, a two-stage high pressure pump, a high pressure injector from a nozzle or an orifice, and a stirrer using ultrasonic wave. The condition for the adjustment of the particle diameter of oil droplets is varied depending on the controlled condition of the shearing force during the homogenizing treatment, the condition of stirring during the polymerization, the type of the reactor, and the amounts of the surfactant and the additives. A suitable condition can be selected by a simple preliminary experiment.

Then, the fluid obtained after the treatment for homogenization described above is transferred to a polymerization reactor. The temperature of the transferred fluid is increased slowly while the fluid is mildly stirred, and the polymerization is allowed to proceed generally at a temperature in the range of 30 to 80° C. By this process, a latex containing uniformly dispersed fine particles of the polymer having an average diameter of single particles of 0.1 to 5 $\mu$m, preferably 0.2 to 3 $\mu$m can be obtained. The molecular weight of the polymer (the weight-average molecular weight) can be controlled to a desired value by adjusting the polymerization temperature or by using a molecular weight modifier. The obtained latex is generally treated by spray drying, and powder of the resin particles can be separated after the step of pulverization of aggregated particles, where necessary.

On the other hand, in the suspension polymerization, the polymerization of a monomer is allowed to proceed by using an initiator soluble in oils as the radical initiator and by heating in an aqueous medium in which the above dispersant or a combination of the above dispersant and the above surfactant, where necessary, are dissolved in advance. During the polymerization, the size of droplets of the monomer is controlled by a stirrer having a specific shearing force, and particles of a polymer having a spherical shape can be obtained. The diameter of the obtained particles is generally in the range of 5 to 80 $\mu$m. After the polymerization is finished, powder of the polymer is separated from the formed slurry containing particles of the polymer by centrifugal filtration followed by drying in a fluid bed drying oven. The molecular weight (the weight-average molecular weight) of the polymer can be controlled to a desired value by adjusting the polymerization temperature or by using a molecular weight modifier.

The powder of the thermoplastic resin as component (B) may have a core/shell structure in which the polymer having the composition described above constitutes the shell. As the core component, polymers of (meth)acrylic esters and/or polymers of dienes having a glass transition temperature of −30° C. or lower, preferably −40° C. or lower, are preferable because the mechanical strength and the modulus of the molded product are remarkably increased. For preparation of the resin particles of the core/shell copolymer described above, (a) a rubbery seed polymer composed of a polymer having a glass transition temperature of −30° C. or lower is prepared as the core by the emulsion polymerization or by the fine suspension polymerization. Examples of the polymer having a glass transition temperature of −30° C. or lower include polymers of esters of (meth)acrylic acid and polymers of dienes. In the present invention, esters of (meth)acrylic acid mean esters of acrylic acid or esters of methacrylic acid. Examples of the monomer of an ester of (meth)acrylic acid forming a homopolymer having a glass transition temperature of −30° C. or lower include n-propyl acrylate (glass transition temperature of the homopolymer, −52° C.), n-butyl acrylate (glass transition temperature of the homopolymer, −54° C.), n-octyl acrylate (glass transition temperature of the homopolymer, −65° C.), 2-ethylhexyl acrylate (glass transition temperature of the homopolymer, −85° C.), and n-decyl methacrylate (glass transition temperature of the homopolymer, −65° C.). The above monomers of an ester of (meth)acrylic acid may be used singly or as a combination of two or more types. The combination of n-butyl acrylate and 2-ethylhexyl acrylate is particularly preferable. Examples of the monomer of a diene forming a homopolymer having a glass transition temperature of −30° C. or lower include conjugated diene compounds, such as butadiene, isoprene, 1,3-pentadiene, and cyclopentadiene, and non-conjugated diene compounds, such as 1,4-hexadiene. The above monomers of a diene may be used singly or as a combination of two or more types. Among these compounds, butadiene and isoprene are particularly preferable.

In the present invention, it is also effective that a crosslinking monomer is added to the above monomer of an ester of (meth)acrylic acid or the above monomer of a diene, where desired, to prepare a core having still higher rubber elasticity. As the crosslinking monomer used for this purpose, monomers having two or more double bonds of substantially the same reactivity, such as ethylene glycol di(meth)acrylate, butylene glycol di(meth)acrylate, trimethylpropane di(meth)acrylate, trimethylol-propane tri(meth)acrylate, hexanediol di(meth)acrylate, oligoethylene di(meth)acrylates, aromatic divinyl monomers such as divinylbenzene, triallyl trimellitate, and triallyl isocyanurate, can be used. The above crosslinking monomers can be used singly or as a combination of two or more types within the range that the glass transition temperature of the obtained polymer is −30° C. or lower. The used amount is selected generally in the range of 0.01 to 5% by weight, preferably 0.1 to 2% by weight, based on the total weight of the monomer of the core. When the used amount of the crosslinking monomer is less than 0.01% by weight based on the total weight of the core, the effect of the crosslinking is hardly exhibited. When the used amount of the crosslinking monomer is more than 5% by weight based on the total weight of the core, crosslinking is excessively formed in the core, and the functions of the powder of the resin of component (B) in the unsaturated polyester resin composition as an improver of the molding property in the molding at a low temperature under a low pressure, as a reinforcing material, and as a low shrinkage agent deteriorate.

In combination with the above monomer of an ester of (meth)acrylic acid, the monomer of a diene, and the crosslinking monomer, other copolymerizable monomers can be used where desired. Examples of the other copolymerizable monomer used where desired include aromatic vinyl compounds, such as styrene, vinyltoluene, and α-methylstyrene, cyanovinyl compounds such as (meth) acrylonitrile, vinylidene cyanide, 2-hydroxyethyl (meth) acrylate, 3-hydroxybutyl acrylate, 2-hydroxyethyl fumarate, hydroxybutyl vinyl ether, monobutyl maleate, glycidyl methacrylate, and butoxyethyl methacrylate. The above other copolymerizable monomers may be used singly or as a combination of two or more types. It is necessary that the used amount be selected within the range that the glass transition temperature of the obtained polymer is −30° C. or lower. The used amount is generally selected in the range of 50% by weight or less based on the total weight of the monomer in the core. A molecular weight modifier, such as t-dodecylmercaptan, may also be added where necessary.

Then, the polymer having a glass transition temperature of −30° C. or lower which has been obtained in the above is used as the core of component (a), and (b) a shell composed of a copolymer having a glass transition temperature of 70° C. or higher is formed on the core. As the material component used for the shell, it is preferred that a monomer which forms a homopolymer having a glass transition temperature of 70° C. or higher is mainly used. Specific examples of the material component used for the shell include monomers of esters of (meth)acrylic acid, such as isopropyl methacrylate (glass transition temperature of the homopolymer, 81° C.), t-butyl methacrylate (glass transition temperature of the homopolymer, 107° C.), cyclohexyl methacrylate (glass transition temperature of the homopolymer, 76° C.), phenyl methacrylate (glass transition temperature of the homopolymer, 110° C.), and methyl methacrylate (glass transition temperature of the homopolymer, 105° C.); aromatic vinyl monomers, such as styrene (glass transition temperature of the homopolymer, 100° C.), 4-chlorostyrene (glass transition temperature of the homopolymer, 110° C.), and 2-ethylstyrene (glass transition temperature of the homopolymer, 103° C.); acrylonitrile (glass transition temperature of the homopolymer, 125° C.); and vinyl chloride (glass transition temperature of the homopolymer, 80° C.). The above compounds may be used singly or as a combination of two or more types. Among these compounds, the monomers of esters of (meth)acrylic acid are preferable, and methyl methacrylate is particularly preferable.

It is preferred that the glass transition temperature of the shell of component (b) is 70° C. or higher, more preferably 90° C. or higher. When the glass transition temperature of the shell is lower than 70° C., the resin particles composed of the core/shell polymer tends to form blocks by aggregation when the particles are dried after the polymerization.

The ratio by weight of the core to the shell is preferably in the range of 1/4 to 3/1, more preferably in the range of 1/3 to 2/1. When the ratio by weight of the core to the shell is less than 1/4, the functions of the powder of the resin in the unsaturated polyester resin composition as the thickening agent, as the improver of the molding property in the molding at a low temperature under a low pressure, and as the reinforcing material deteriorate. When the ratio by weight of the core to the shell is more than 3/1, there is the possibility that the stability in viscosity of the unsaturated polyester resin composition is decreased.

In the present invention, a metal cation used as the crosslinking agent forms crosslinking between carboxyl groups which have been incorporated as the side chains in the shell of the core/shell copolymer. At a room temperature, the three-dimensional polymer structure formed by the crosslinking decrease the tendency for swelling of the unsaturated polyester resin and the liquid polymerizable monomer which work as the dispersion media. On the other hand, when heated, the unsaturated polyester resin and the liquid polymerizable monomer are cured while these compounds penetrate into the core/shell copolymer. Thus, the proper characteristics are exhibited.

In order to achieve the ionic crosslinking, a monomer of a radical polymerizable unsaturated carboxylic acid having carboxyl group is introduced as a material component of the shell. Examples of the monomer of a radical polymerizable unsaturated carboxylic acid include unsaturated monocarboxylic acids, such as (meth)acrylic acid, 2-ethylpropenic acid, and crotonic acid; unsaturated polycarboxylic acids, such as maleic acid, itaconic acid, fumaric acid, citraconic acid, and chloromaleic acid; and anhydrides of the unsaturated polycarboxylic acids; and derivatives of the unsaturated polycarboxylic acids having at least one carboxyl group, such as monomethyl maleate, monoethyl maleate, monobutyl maleate, monomethyl fumarate, monoethyl fumarate, monomethyl itaconate, monoethyl itaconate, and monobutyl itaconate. The above monomers of radical polymerizable unsaturated carboxylic acids may be used singly or as a combination of two or more types. Among these compounds, (meth)acrylic acid, maleic acid, and maleic anhydride are particularly preferable.

It is preferred that, in the copolymer of the shell, the monomer unit containing carboxyl group is present in an amount of 0.01 to 20 parts by weight, more preferably 0.05 to 10 parts by weight, still more preferably 0.1 to 5 parts by weight, per 100 parts by weight of the copolymer. When the content of the monomer unit containing carboxyl group is less than 0.01 parts by weight per 100 parts by weight of the copolymer, the effect of modifying the surface of the particles by the ionic crosslinking is hardly exhibited. When the content of the monomer unit containing carboxyl group is more than 20 parts by weight per 100 parts by weight of the copolymer, the effect of modifying the surface of the particles is not exhibited to the degree expected from the content, and on the other hand, the proper mechanical properties of the core/shell copolymer are deteriorated.

In the present invention, for producing the core/shell copolymer, the monomer described above for forming the shell is added to the latex of the seed polymer of component (a) which forms the core, and the polymerization is allowed to continue. In the reaction of the latter step, the emulsion polymerization is generally adopted. The process in which a solution of an emulsifier and a solution of a radical polymerization initiator are added in small separate quantities during a specified period is frequently used in order to obtain a stable reaction product.

For producing the core/shell copolymer which is ionically crosslinked, a specified amount of the above monomer containing carboxyl group is generally mixed into the monomer used for forming the shell in the latter step described above. The whole shell may be formed with the copolymer containing carboxyl group, or the outermost layer of the shell alone may be formed with the copolymer containing carboxyl group. When the outermost layer of the shell alone is formed with the copolymer containing carboxyl group, a process in which the monomer having carboxyl group is continuously or intermittently added in the later period of the polymerization reaction to form the shell or a process in which polymer particles prepared by polymerizing a monomer of an ester of (meth)acrylic acid used as the component of the shell is saponified with an alkali after the polymerization has been finished can be adopted. It is preferred that the content of the monomer unit containing carboxyl group in the whole core/shell copolymer particles is kept small by using the process for incorporating carboxyl group only in the outermost layer of the shell so that the proper physical properties of the core/shell copolymer are maintained. The core/shell copolymer can be obtained by a multi-stage polymerization having at least two stages as described above. However, the core/shell copolymer may also be prepared by partially coagulating the seed latex prepared in the first stage by an inorganic acid, an alcohol, or the monomer, followed by graft polymerization to the obtained product.

In the present invention, it is preferred that a metal cation is added to the core/shell copolymer to crosslink the carboxyl groups in the shell. As the metal cation, for example, monovalent ions of metals, such as potassium, sodium, lithium, and cesium; and divalent ions of metals, such as calcium, zinc, tin, chromium, and lead, can be used. Particularly, monovalent ions and divalent ions of metals belonging to Groups I and II of the Periodic Table are preferable. As the source of the cation, salts of inorganic acids, such as oxides, hydroxides, phosphates, carbonates, nitrates, sulfates, chlorides, nitrites, and sulfites; salts of organic acids, such as formic acid, acetic acid, propionic acid, valeric acid, caprylic acid, capric acid, palmitic acid, stearic acid, oleic acid, erusic acid, linolenic acid, succinic acid, adipic acid, naphthenic acid, and thiocarboxylic acids; salts of acetylacetone; and alcoholates, such as ethoxides and methoxides, can be used. When a salt of an acid is used, the acid preferably has a dissociation constant $pK_a$ of 4 or more. Among these metal cations, hydroxides and salts of carboxylic acids of monovalent metals are particularly preferable in view of the reaction efficiency of the ionic crosslinking and the mechanical strength of the heat molded product. The above source of the monovalent and divalent ions has the characteristic that the ionic crosslinking is possible within several minutes at a room temperature when the reaction is conducted in a solution.

In the composition of the present invention, it is necessary that the powder of the resin as component (B) be used in an amount of 20 to 120 parts by weight, preferably 25 to 100 parts by weight, more preferably 30 to 90 parts by weight, per 100 parts by weight of the above unsaturated polyester resin of component (A). When the amount is less than 20 parts by weight, the viscosity of the composition is low, and the preparation of SMC is difficult. When the amount is more than 120 parts by weight, the viscosity is excessively high, and there is the possibility that mixing of glass fiber or the like becomes difficult.

In the present invention, a liquid polymerizable monomer is used as component (C). The liquid polymerizable monomer is a liquid substance at a room temperature under an atmospheric pressure and generally used also as the solvent for the unsaturated polyester resin of component (A). The preferable compound as component (C) is at least one liquid polymerizable monomer selected from the group consisting of esters of acrylic acid, esters of methacrylic acid, aromatic vinyl compounds, and aromatic allyl compounds. The liquid polymerizable monomer is brought into reaction with the above unsaturated polyester resin of component (A) to form crosslinking during the processing.

Examples of the ester of acrylic acid include methyl acrylate, ethyl acrylate, n-propyl acrylate, isopropyl acrylate, n-butyl acrylate, isobutyl acrylate, sec-butyl acrylate, t-butyl acrylate, n-hexyl acrylate, cyclohexyl acrylate, 2-ethylhexyl acrylate, and n-octyl acrylate. Examples of the ester of methacrylic acid include methyl methacrylate, ethyl methacrylate, n-propyl methacrylate, isopropyl methacrylate, n-butyl methacrylate, n-hexyl methacrylate, cyclohexyl methacrylate, 2-ethylhexyl methacrylate, n-octyl methacrylate, diethylene glycol dimethacrylate, and trimethylolpropane trimethacrylate. Examples of the aromatic vinyl compound include styrene, α-methylstyrene, vinyltoluene, t-butylstyrene, α-chlorostyrene, dichlorostyrene, and divinylbenzene. As the aromatic allyl compound, diallyl phthalate, diallyl isophthalate, and triallyl trimellitate can be used. Among these liquid polymerizable monomers, styrene is particularly preferable.

The above liquid polymerizable monomers of component (C) may be used singly or as a combination of two or more types. The used amount is selected in the range of 30 to 120 parts by weight, preferably in the range of 40 to 100 parts by weight, per 100 parts by weight of the above unsaturated polyester resin of component (A). When the amount is less than 30 parts by weight, the viscosity of the composition is low, and the preparation of SMC is difficult. When the amount is more than 120 parts by weight, there is the tendency that the finished molded product becomes brittle.

In the composition of the present invention, a curing agent is used as component (D) in combination with component (A), component (B), and component (C). The curing agent generates radicals by decomposition with heat and has the function of curing the whole composition by crosslinking and polymerization of the liquid polymerizable monomer of component (C) to form bonding with the unsaturated polyester resin of component (A). Specific examples of the curing agent include organic peroxides, such as t-butyl peroxybenzoate, benzoyl peroxide, methyl ethyl ketone peroxide, dicumyl peroxide, t-butyl peroxy-2-ethylhexanoate, di-t-butyl hydroperoxide, lauroyl peroxide, 1,1-di-t-butylperoxy-3,5,5-trimethylcyclohexane, t-butylperoxyisopropyl carbonate, and bis(4-t-butylcyclohexyl) peroxycarbonate. A curing stabilizer may be used in combination with the above curing agent where desired. Examples of the curing stabilizer include hydroquinone, naphthoquinone, and t-butylcatechol.

The above curing agents of component (D) may be used singly or as a combination of two or more types. The used amount is selected in the range of 0.1 to 5 parts by weight, preferably in the range of 0.5 to 3 parts by weight, per 100 parts by weight of the unsaturated polyester resin of component (A). When the amount is less than 0.1 parts by weight, there is the possibility that the curing during the molding is insufficient. When the amount is more than 5 parts by weight, there is the possibility that the storage stability of the composition is decreased.

Examples of the reinforcing material of component (E) include reinforcing materials conventionally used for production of FRP (fiber reinforced plastics), such as glass fiber, polyester fiber, phenol fiber, polyvinyl alcohol fiber, aromatic polyamide fiber (Kevlar fiber, a trade name for the product of DU PONT Company), nylon fiber, and carbon fiber. As the form of the reinforcing material, for example, chopped strands, chopped strand mats, rovings, and fabrics can be used. The reinforcing material can suitably be selected by considering the viscosity of the composition and the strength of the obtained molded product.

By adding the reinforcing material of component (E) to the unsaturated resin composition comprising components (A), (B), (C), and (D), a polyester resin molding material providing a molded product having a sufficient mechanical strength can be obtained.

The length of the chopped strands is generally 5 to 60 mm for SMC and 2 to 8 mm for BMC. When the length is shorter, the material for molding has a better fluidity, and on the other hand, the mechanical strength of the molded product is decreased.

In the composition of the present invention, various types of additive conventionally used for unsaturated polyester resin compositions for SMC, such as agents for decreasing shrinkage, inorganic fillers, and mold release agents, can be added where desired within the range that the object of the present invention is not adversely affected.

Examples of the agent for decreasing shrinkage include thermoplastic resins, such as polystyrene, polyethylene, polymethyl methacrylate, polyvinyl chloride, polyvinyl acetate, polycaprolactum, saturated polyesters, and styrene-acrylonitrile copolymer; and rubbery polymers, such as polybutadiene, polyisoprene, styrene-butadiene copolymer, and acrylonitrile-butadiene copolymer. The above object can be achieved by using the agent for decreasing shrinkage generally in an amount of 4 to 10 parts by weight per 100 parts by weight of the unsaturated polyester resin. In this regard, the used amount of the agent for decreasing shrinkage is different from the used amount of the above powder of the thermoplastic resin used as a component in the present invention. Liquid materials obtained by dissolving the above thermoplastic resins or the above rubbery polymers in styrene, methyl methacrylate, or ethyl acrylate are also commercially available.

Examples of the inorganic filler include calcium carbonate, magnesium carbonate, barium sulfate, mica, talc, kaolin, clay, sellaite, asbestos, baryte, barite, silica, silica sand, dolomite lime, gypsum, fine powder of alumina, hollow balloons, alumina, glass powder, aluminum hydroxide, white marble, zirconium oxide, antimony trioxide, titanium oxides, and molybdenum dioxide. The inorganic filler is suitably selected by considering workability as well as strength, appearance, and economy of the obtained molded product. In general, calcium carbonate and aluminum hydroxide are frequently used. When an oxide of an alkaline earth metal which has conventionally been used as the agent for preparation of SMC (the thickening agent) is used, it is generally necessary that an inorganic filler, such as calcium carbonate, be used in a large amount, such as an amount around 100 parts by weight per 100 parts by weight of the unsaturated polyester resin of component (A), in combination the agent for preparation of SMC because a sufficient effect of thickening is hardly obtained by using the agent for preparation of SMC alone. In contrast, when the agent for preparation of SMC of the present invention which contains the powder of the thermoplastic resin as the effective component thereof is used, the preparation of SMC is possible even without using an inorganic filler. As the result, the fluidity of the SMC sheet during heat molding is improved, and the transparency and the coloring property of the molded product become excellent.

Examples of the mold release agent include higher fatty acids, such as stearic acid, salts of higher fatty acids, such as zinc stearate, and esters of alkylphosphoric acids. The mold release agent is generally used in an amount of 0.5 to 5 parts by weight per 100 parts by weight of the unsaturated polyester resin of component (A).

In addition to the above agents, cure accelerators, coloring agents, defoaming agents, and agents for decreasing viscosity can be used where necessary.

The unsaturated polyester resin composition of the present invention can be prepared in accordance with the same procedures as those for preparation of conventional unsaturated polyester resin compositions. In other words, the same procedures as those for preparation of the conventional resins can be used except that the powder of the thermoplastic resin is used as the thickening agent in place of an oxide or a hydroxide of an alkaline earth metal.

For preparing the unsaturated polyester resin composition of the present invention in accordance with a conventional process, the unsaturated polyester resin (A) is dissolved in all or a part of the liquid polymerizable monomer in advance. To the obtained solution, the remaining components (B), (C), and (D) in specified amounts are added together, and the resultant mixture is sufficiently mixed by stirring in a conventional mixer, such as a planetary mixer, a kneader, and a disper. Addition of the reinforcing material used for the preparation of SMC, such as glass fiber, is generally conducted immediately before the process of rolling the mixture in an SMC machine. When the reinforcing material is mixed at the beginning of the process, the viscosity of the composition is excessively high, and rolling the mixture to form a sheet becomes difficult. SMC is generally prepared in accordance with the process shown in FIG. 1. A mixture 2 prepared in a mixer 1 is applied to one or both of two release films 3 by a coater 4 to coat the films to a uniform thickness of 0.3 to 3 mm. A reinforcing material 5 is cut by a chopper 6 and spread on the coated release films, and then the release films are attached to each other in such a manner that the coated sides are placed between the two release films. The combined release films are rolled by a roller 7 to obtain a sheet having a thickness of 0.5 to 5 mm. The obtained sheet is wound by a winding roller 8 in the condition that both sides are covered with the release films.

When SMC is prepared by using the composition of the present invention, another process in which the powder of the resin used as the thickening agent is added before, after, or simultaneously with the addition of the reinforcing material may also be adopted in place of the conventional process described above. In FIG. 1, the position of addition of the powder of the resin used as the thickening agent is x in the conventional process and y or z in the process of the present invention. When the above process of the present invention is adopted, the initial mixture which is prepared by the mixer and contains the unsaturated polyester resin, the liquid polymerizable monomer, and the curing agent shows a very slow rate of increase in the viscosity and is free from the restriction with respect to time in the conventional process that SMC must be prepared immediately after the initial mixing. The initial mixture prepared in accordance with the process of the present invention can easily be applied to the surface for coating because of the low viscosity, and on the other hand, the viscosity of the coated layer is rapidly increased when the powder of the resin used as the thickening agent and the reinforcing material are spread on the coated surface. By rolling the resultant sheet, SMC having the desired semi-hard property can immediately be prepared.

The composition of the present invention can be molded by various types of molding process, such as the matched die process, the injection molding process, the transfer molding process, and the hand lay up process, in addition to the SMC process, the BMC process.

When SMC is molded, the molding temperature in the compression molding is selected in the range of 40 to 180° C., preferably in the range of 40 to 100° C. The molding pressure can be selected in the conventional range of 30 to 100 kgf/cm$^2$ and can also be selected in the range of 0.1 to 10 kgf/cm$^2$ wherein the molding can be conducted in 1 to 10 minutes. Moreover, it becomes possible that the following molding process (hereinafter, referred to as the vacuum molding) is conducted: SMC is disposed on a mold; the part over the SMC is closed by using a sheet made of polypropylene or by an upper mold; then, the system is evacuated to bring the SMC adhered to the (lower) mold; and the SMC is molded into a shape by pressing the SMC to the mold by the difference between the pressure at the inside of the mold and the atmospheric pressure at the outside. Thus, the requirement for large scale facilities for a higher temperature and a high pressure in the conventional process can be eliminated. The vacuum molding in the present invention can be conducted generally at a temperature of 50 to 150° C. under a pressure of −760 to −50 mmHg (0 to 710 Torr).

The above vacuum molding is enabled by using the material for molding of the present invention. Conducting the air compression molding in which SMC is pressed to the mold from the opposite side by using a compressed air also becomes possible under the condition of a temperature of 50 to 150° C. and a pressure of 1 to 5 kgf/cm$^2$ (gauge pressure).

When SMC of a conventional type is molded under such a low pressure as described above, forming the SMC to the shape of the mold is very difficult. In contrast, SMC prepared by using the material for molding of the present invention can be shaped by softening at a low temperature under a low pressure. Therefore, preparation of a laminate of SMC made of 2 to 10 sheets is possible when SMC in accordance with the present invention is used, while only a single sheet of SMC can be shaped under limited conditions when a conventional SMC is used. Thus, it becomes possible that molded products having a larger thickness are obtained. The viscosity of the mixture comprising components (A), (B), and (C) is 2,000,000 cps or more, preferably 5,000,000 to 10,000,000 cps, at 25° C., and 5,000 to 100,000 cps, preferably 10,000 to 50,000 cps, at 80° C.

BMC having various shapes, such as pellets, pebbles, and bricks, as well as various sizes can be used. The diameter or the length is generally 0.5 to 50 cm. The bulk materials having a shape of a cube having an edge length of about 10 cm or more, a shape of a rectangular parallelepiped having a shorter edge length of about 10 cm or more, a shape of a sphere having a diameter of about 10 cm or more, or an ellipsoid having a smaller diameter of about 10 cm or more are covered with a release film and stored.

BMC has heretofore been molded by the compression molding process, the transfer molding process, or the injection molding process under the condition of 130 to 170° C., 30 to 200 kgf/cm$^2$, and 2 to 10 minutes. In the compression molding using BMC in accordance with the present invention, BMC is placed in a mold and can be molded at 40 to 100° C. under 0.1 to 10 kgf/cm$^2$ (gauge pressure). In the transfer molding, BMC is placed in a transfer pot, softened at 50 to 150° C., and can be molded by pressing into a cavity heated to 50 to 150° C. under 1 to 20 kgf/cm$^2$ (gauge pressure). In the injection molding of BMC in accordance with the present invention, a molded product can be obtained at 50 to 150° C. under 1 to 20 kgf/cm$^2$ (gauge pressure).

In the composition of the present invention, in place of an oxide of an alkaline earth metal which has conventionally been used as the agent for preparation of SMC (the thickening agent), the powder of the thermoplastic resin having a particle diameter and the surface condition which provide an excellent viscosity for processing is mixed with the unsaturated polyester resin in combination with the liquid polymerizable monomer. The powder of the resin swells by absorbing the liquid polymerizable monomer, and the viscosity is increased. Therefore, the excellent viscosity for processing can be obtained without adding an oxide of an alkaline earth metal, and the procedures for preparation of a sheet can be facilitated because the viscosity of the obtained SMC is increased by maturing for several hours after the preparation, and the pseudo-curing takes place. Thus, SMC sheet having the desired hardness and excellent in cleavage of the release film can be obtained even after a short time for maturing.

The SMC sheet or the BMC of the present invention shows little change in the hardness after storage for a long time, and can satisfactorily reproduce the shape of a mold in the low pressure molding, in the vacuum molding, or in the air compression molding. Even when a curing agent of a low temperature decomposition type is used, the stability of the SMC sheet is satisfactory in storage for a long time at a room temperature. In the low pressure molding, adjustment of the viscosity, such as decrease in the used amount of glass fiber, is not required.

The composition of the present invention exhibits an excellent workability under the processing condition of a low temperature and/or a low pressure, and finished molded products obtained by heating the SMC sheet or the BMC are excellent in the low shrinkage because of the presence of the powder of the thermoplastic resin as component (B). A smooth surface of the so-called Class A grade can be achieved on the surface of the molded product because of the absence of the rough surface formed on the molded product by the glass fiber left remaining after shrinking.

EXAMPLES

In Examples 1 to 8, Reference Examples 1 and 2, Comparative Examples 1 to 7, and Synthesis Example 1, the evaluations were made in accordance with the following methods.

(1) Viscosity

For the measurement of the viscosity, two samples of an unsaturated polyester resin composition were taken, and the two samples were kept at 40° C. for 24 hours. One of the samples was used for the measurement at this time. The other sample was further kept at 30° C. for 30 days, and then used for the measurement. The samples for the measurement were placed in a chamber kept at a constant temperature of 25° C. for 1 hour, and the viscosity of each sample was measured under an atmosphere of a temperature of 25° C. and a relative humidity of 60%. As the viscometer, a rotating viscometer produced by HAAKE Company, Rheo Stress RS-100 Type, was used.

(2) Cleavage of a release film

A sample of SMC was matured at 40° C. for 24 hours and then kept under the condition of a temperature of 25° C. and a relative humidity of 60% for 1 hour. The release film was cleaved from the conditioned SMC by hands, and the cleavage was evaluated in accordance with the following criterion:

○: easily cleaved; no attachment of SMC components on the release film

Δ: less easily cleaved than the above; no attachment of SMC components on the release film x: not easily cleaved; or SMC components attached to the release film even when easily cleaved (3) Average diameter of single particles (3-1) When the average diameter of single particles is 10 μm or less:

A sample was prepared by adding 0.2 g of powder of a thermoplastic resin to 100 ml of water, followed by dispersing the powder by application of ultrasonic wave. A photograph of the sample with 10,000 times magnification was taken by a transmission electron microscope. The lengths of 800±100 single particles were measured, and the average value of these lengths was obtained as the average diameter.

(3-2) When the average diameter of single particles is more than 10 μm:

The average diameter was measured by using a Coulter Counter produced by NIKKAKI Co., Ltd. in accordance with the Aperture Method using a 200 μm aperture tube.

(4) Gel content

Powder of a resin in an amount of 20 g was added to 200 g of toluene, and the resultant mixture was stirred for 1 hour and then left standing for 24 hours both at a room temperature. Then, the mixture was treated by the centrifugal separation, and the resultant supernatant fluid was removed. The remaining residue was dried in a vacuum, and the content of the insoluble fraction was obtained as the gel content in the resin.

(5) Bending modulus

The unsaturated polyester resin compositions prepared in accordance with the formulations shown in Table 1 were used. Test pieces having a thickness of 4 mm were prepared by casting by heating at 80° C. under 2 kg/cm² for 60 minutes, and subjected to the bending test in a room adjusted to 25° C. in accordance with the method of Japanese Industrial Standard K7055 to obtain the bending modulus.

EXAMPLE 1 AND 2

Unsaturated polyester resin compositions were prepared by dispersing and mixing the components of the types and the amounts shown in Table 1 at a room temperature (wherein component (A) had been dissolved in component (C) in advance). The obtained compositions were continuously applied each to a polypropylene film (a release film) to form a coating layer of a width of 200 mm×a length of 300 mm×a thickness of 2 mm. The coated film was matured at 40° C. for 24 hours. During these processes, the viscosity of the composition and the cleavage of the release film were evaluated. The press molding was conducted by using a mold of 300 mm×300 mm in which the charged area of a cut sheet of an SMC (300 mm×33 mm) occupied 11%. In order to examine that the SMC is distributed uniformly in the mold and that no air is contained, the specific gravity was measured at a central part and at a peripheral part. The results are shown in Table 1.

In both of Examples 1 and 2, the viscosity showed the values suitable for preparation of SMC after 24 hours, and the release films could be cleaved easily. The prepared compositions showed little increase in the viscosity, and the release films could easily be cleaved after storage for 30 days at 30° C. However, the composition after the maturing showed the tendency that the adhesion to the release film decreased in proportion to the increase in the added amount of the fine powder of polymethyl methacrylate (hereinafter, referred to as PMMA). Thus, it was found that a larger amount of the fine powder of PMMA is preferable within the specified range in order to have a better releasing property of the film in a short time at a room temperature. In both examples, the composition was distributed throughout the mold to form a uniform sheet under any combinations of the high temperature (140° C.) and the low temperature (90° C.), the high pressure (80 kg/cm²) and the low pressure (2 kg/cm²), and 10 minutes. The higher pressure gave a larger specific gravity, and this can be considered to arise from the higher degree of compression.

COMPARATIVE EXAMPLES 1 AND 2

Unsaturated polyester resin compositions were prepared and evaluated by the same procedures as those in Examples 1 and 2 by using the components of the types and the amounts shown in Table 1 (wherein component (A) had been dissolved in component (C) in advance). The results are shown in Table 1.

In Comparative Example 1, the used amount of the powder of PMMA was as small as 10 parts by weight, and the cleavage of the release film was so inferior after 24 hours that the product could not be used practically although the preparation of SMC was possible. However, the product could somehow be used practically after 3 days although some degree of tackiness was still remaining. Molding was possible under any combinations of the high temperature, the low temperature, the high pressure, and the low pressure.

In Comparative Example 2, the used amount of the powder of PMMA was as high as 90 parts by weight. The viscosity immediately after the mixing was significantly increased, and the addition of glass fiber appeared to be difficult. After the composition was matured at 40° C. for 24 hours, the sheet of the prepared SMC was in the condition that flexibility is lost, and in molding with pressure, the composition could not be spread sufficiently throughout the mold, and the formation of many bubbles in the molded product was confirmed.

EXAMPLE 3 AND COMPARATIVE EXAMPLES 3 AND 4

Unsaturated polyester resin compositions were prepared by the same procedures as those in Examples 1 and 2 by using the components of the types and the amounts shown in Table 1 (wherein component (A) had been dissolved in component (C) in advance). After glass fiber was added to the obtained compositions, SMC sheets were prepared. After the prepared sheets were matured at 40° C., the viscosity of the SMC sheets and the cleavage of release films were evaluated. The prepared SMC sheets were molded by pressing for 10 minutes at a high temperature (140° C.) or a low temperature (90° C.) under a high pressure (80 kg/cm$^2$) or a low pressure (2 kg/cm$^2$). The storage stability of the SMC was evaluated. The results are shown in Table 1. The dimensions of the SMC sheets and the mold were the same as those used in Examples 1 and 2.

In Example 3, 38.5 parts by weight of glass fiber having a diameter of 13 μm and a length of 1 inch per 100 parts by weight of the unsaturated polyester resin was used in addition to the formulation used in Example 1. Satisfactory packing in the mold was achieved by molding under any combinations of the high temperature, the low temperature, the high pressure, and the low pressure. The obtained SMC showed good storage stability at 30° C. for 1 month or more.

In Comparative Example 3, the powder of PMMA was not used, and a conventional unsaturated polyester resin composition was prepared by adding 15.4 parts by weight of magnesium oxide per 100 parts by weight of the unsaturated polyester resin. The material could not be distributed throughout the mold when the material was molded under the condition of the high temperature and the low pressure. When the material was molded under heating at the low temperature, the curing was not achieved under any of the conditions of the high pressure and the low pressure. When the SMC sheet was stored at 30° C., the sheet almost lost flexibility after 1 month or more, and after about 35 days, the sheet could not practically be used.

In Comparative Example 4, the type of the curing agent was different from that used in Comparative Example 3. The obtained material was not distributed throughout the mold in molding under the condition of the high temperature and the low pressure. At the low temperature, the molding could be achieved under the high pressure, but the material was not distributed throughout the mold under the low pressure. When the SMC sheet was stored at 30° C., the sheet became so hard that the sheet could not practically be used after 3 days.

TABLE 1

| Example | 1 | 2 | | |
|---|---|---|---|---|
| Comparative Example | | | 1 | 2 |
| Formulation (amount in part by weight) | | | | |
| (A) unsaturated polyester resin[1] | 65 | 65 | 65 | 65 |
| (B) Zeon F-320[2] | 20 | 60 | 10 | 90 |
| (C) styrene | 35 | 35 | 35 | 35 |
| (D) Percure O[3] | 2 | 2 | 2 | 2 |
| Perbutyl Z[4] | — | — | — | — |
| Percadox 16[5] | 1 | 1 | 1 | 1 |
| other components | | | | |
| glass fiber | — | — | — | — |
| MgO #40[6] | — | — | — | — |
| stearic acid[7] | 4 | 4 | 4 | 4 |
| NS-100[8] | 130 | 130 | 130 | 130 |
| SZ-2000[9] | — | — | — | — |
| Results of evaluation viscosity | | | | |
| after 40° C. × 24 hrs. (10$^5$ cps) | 35 | 151 | 6.5 | >500 |
| after 40° C. × 24 hrs. + 30° C. × 30 days (10$^5$ cps) | 44 | 268 | 11 | ≧500 |
| cleavage of release film | ○ | ○ | × | ○ |
| specific gravity of molded product (g/cm$^3$) | | | | |
| high temperature, 140° C. | | | | |
| high pressure molding (80 kg/cm$^2$) | | | | |
| central part of a plate | 1.17 | 1.15 | 1.20 | many bubbles |
| peripheral part of a plate | 1.17 | 1.15 | 1.20 | many bubbles |
| low pressure molding (2 kg/cm$^2$) | | | | |
| central part of a plate | 1.15 | 1.14 | 1.18 | poor fluidity |
| peripheral part of a plate | 1.15 | 1.14 | 1.18 | poor fluidity |
| low temperature, 90° C. | | | | |
| high pressure molding (80 kg/cm$^2$) | | | | |
| central part of a plate | 1.17 | 1.14 | 1.20 | many bubbles |
| peripheral part of a plate | 1.17 | 1.14 | 1.20 | many bubbles |
| low pressure molding (2 kg/cm$^2$) | | | | |
| central part of a plate | 1.15 | 1.14 | 1.18 | poor fluidity |
| peripheral part of a plate | 1.15 | 1.14 | 1.18 | poor fluidity |
| bending modulus (kg/mm$^2$) | 370 | 350 | 350 | not measurable |

| Example | 3 | | |
|---|---|---|---|
| Comparative Example | | 3 | 4 |
| Formulation (amount in part by weight) | | | |
| (A) unsaturated polyester resin[1] | 65 | 65 | 65 |
| (B) Zeon F-320[2] | 20 | — | — |
| (C) styrene | 35 | 35 | 35 |
| (D) Percure O[3] | 2 | — | 2 |
| Perbutyl Z[4] | — | 1 | — |
| Percadox 16[5] | 1 | — | 1 |
| other components | | | |
| glass fiber | 25 | 25 | 25 |
| MgO #40[6] | — | 10 | 10 |
| stearic acid[7] | 4 | — | — |
| NS-100[8] | 130 | 130 | 130 |
| SZ-2000[9] | — | 4 | 4 |
| Results of evaluation viscosity | | | |
| after 40° C. × 24 hrs. (10$^5$ cps) | 30 | 37 | 78 |
| after 40° C. × 24 hrs. + 30° C. × 30 days (10$^5$ cps) | 39 | 92 | cured |
| cleavage of release film | ○ | Δ | not measured |

TABLE 1-continued

| specific gravity of molded product (g/cm³) | | | |
|---|---|---|---|
| high temperature, 140° C. | | | |
| high pressure molding (80 kg/cm²) | | | |
| central part of a plate | 1.75 | 1.75 | poor fluidity |
| peripheral part of a plate | 1.75 | 1.75 | poor fluidity |
| low pressure molding (2 kg/cm²) | | | |
| central part of a plate | 1.73 | poor fluidity | poor fluidity |
| peripheral part of a plate | 1.73 | poor fluidity | poor fluidity |
| low temperature, 90° C. | | | |
| high pressure molding (80 kg/cm²) | | | |
| central part of a plate | 1.75 | not cured | 1.75 |
| peripheral part of a plate | 1.75 | not cured | 1.75 |
| low pressure molding (2 kg/cm²) | | | |
| central part of a plate | 1.73 | not cured | poor fluidity |
| peripheral part of a plate | 1.15 | not cured | poor fluidity |
| bending modulus (kg/mm²) | not measured | not measured | not measured |

Notes to Table 1
[1] Unsaturated polyester resin 1: a random copolymer having a composition of propylene glycol/neopentyl glycol/isophthalic acid/fumaric acid = 15/35/20/30 mol %; number-average molecular weight, 3,300.
[2] Zeon F-320: powder of polymethyl methacrylate; average diameter of single particles, 1.9 μm; weight-average molecular weight, 30,000; a product of NIPPON ZEON Co., Ltd.
[3] Percure O: a curing agent; t-butyl peroxy-2-ethylhexanoate; half-life, 65° C. × 24 hours; a product of NIPPON YUSHI Co., Ltd.
[4] Perbutyl Z: a curing agent; t-butyl peroxybenzoate; half-life, 105° C. × 8.9 hours; a product of NIPPON YUSHI Co., Ltd.
[5] Percadox 16: a curing agent; bis-4-t-butylcylcohexyl peroxydicarbonate; half-life, 40° C. × 10 hours; a product of KASEI AKZO Co., Ltd.
[6] MgO #40: a thickening agent; magnesium oxide; a product of KYOWA KAGAKU Co., Ltd.
[7] Stearic acid: a mold release agent; a product of SAKAI KAGAKU KOGYO Co., Ltd.
[8] NS-100: a filler; calcium carbonate; a product of NITTO FUNKA KOGYO Co., Ltd.
[9] SZ-2000: a mold release agent; zinc stearate; a product of SAKAI KAGAKU KOGYO Co., Ltd.

EXAMPLES 4 TO 7, REFERENCE EXAMPLES 1 AND 2, AND COMPARATIVE EXAMPLES 5 TO 7

Unsaturated polyester resin compositions were prepared and evaluated by the same procedures as those in Examples 1 and 2 by using the components of the types and the amounts shown in Table 2. The results are shown in Table 2.

In Example 4, an ester of methacrylic acid was used as the liquid polymerizable monomer of component (C). In Examples 5 and 6, the resin particles of component (B) contain a gel fraction of 50% by weight or less. These examples show that the compositions had advantageous viscosities, and the cleavage of the releasing films from the SMC treated at 40° C. for 24 hours was good in all the materials.

When the diameter of the resin particles of the thickening agent was smaller or larger than the range of 0.2 to 40 μm, the viscosity of the composition is rapidly or slowly increased (Reference Examples 1 and 2).

It can be understood from the results of Comparative Examples 5 and 6 that, when the used amount of the liquid polymerizable monomer of component (C) was either smaller or larger than the specified range, the viscosity of the obtained composition was at the outside of the suitable range to cause difficulty in the preparation of SMC, and the cleavage of the release film was inferior after the material was kept for at 40° C. for 24 hours.

The results in Comparative Example 7 show that, when the vinyl chloride resin is used as the powder of the resin of component (B), the swelling property is insufficient, and the powder of this resin is not suitable.

Example 7 shows an example of the present invention in which no inorganic filler was used.

TABLE 2

| Example | 4 | 5 | 6 | | | | | | 7 |
|---|---|---|---|---|---|---|---|---|---|
| Reference Example | | | | 1 | 2 | | | | |
| Comparative Example | | | | | | 5 | 6 | 7 | |
| Formulation (part by weight) | | | | | | | | | |
| (A) unsaturated polyester resin[1] | 60 | 70 | 70 | 70 | 70 | 85 | 40 | 70 | 70 |
| (B) Zeon F-320[2] | 30 | — | — | — | — | 30 | 40 | — | 50 |
| Zeon R-103[3] | — | — | — | — | 50 | — | — | — | — |
| fine particles A of PMMA[4] | — | — | — | 30 | — | — | — | — | — |
| Zeon F-301[5] | — | 30 | — | — | — | — | — | — | — |
| crosslinked styrenic resin[6] | — | — | 30 | — | — | — | — | — | — |
| Zeon 121[7] | — | — | — | — | — | — | — | 50 | — |
| (C) styrene monomer | — | 30 | 30 | 30 | 30 | 15 | 60 | 30 | 30 |
| diethyleneglycol dimethacrylate | 40 | — | — | — | — | — | — | — | — |
| (D) Percure O[8] | 2 | 2 | 2 | 2 | 2 | 2 | 2 | 2 | 2 |
| Percadox 16[9] | 1 | 1 | 1 | 1 | 1 | 1 | 1 | 1 | 1 |
| others | | | | | | | | | |
| stearic acid[10] | 4 | 4 | 4 | 4 | 4 | 4 | 4 | 4 | 4 |
| NS-100[11] | 130 | 130 | 130 | 130 | 130 | 130 | 130 | 130 | — |
| Results of evaluation | | | | | | | | | |
| viscosity | | | | | | | | | |
| after 40° C. × 24 hrs. (10⁵ cps) | 35 | 25 | 27 | gel | 86 | >500 | 18 | 9.3 | 14.1 |
| after 40° C. × 24 hrs. + 30° C. × days (10⁵ cps) | 47 | 36 | 121 | gel | 103 | — | 91 | 9.6 | 33.5 |

TABLE 2-continued

| Example | 4 | 5 | 6 | | | | | 7 |
|---|---|---|---|---|---|---|---|---|
| Reference Example | | | | 1 | 2 | | | |
| Comparative Example | | | | | | 5 | 6 | 7 |
| cleavage of release film | ○ | ○ | ○ | — | Δ | no flow | x | x | ○ |

Notes to Table 2
[1] Unsaturated polyester resin: a random copolymer having a composition of propylene glycol/ethylene glycol/phthalic anhydride/fumaric acid = 30/20/30/20 mol %; number-average molecular weight, 2,100.
[2] Zeon F-320: powder of polymethyl methacrylate; average diameter of single particles, 1.9 $\mu$m; weight-average molecular weight, 30,000; a product of NIPPON ZEON Co., Ltd.
[3] Zeon R-103: PMMA; average diameter of single particles, 45 $\mu$m; weight-average molecular weight, 30,000; a product of NIPPON ZEON Co., Ltd.
[4] Fine particles A of PMMA: average diameter of single particles, 0.1 $\mu$m; weight-average molecular weight, 40,000; a trial product of NIPPON ZEON Co., Ltd.
[5] Zeon F-301: a partially crosslinked PMMA; average diameter of single particles, 2 $\mu$m; gel content, 35% by weight; a product of NIPPON ZEON Co., Ltd.
[6] Crosslinked styrenic resin: styrenic resin crosslinked by divinylbenzene; average diameter of single particles, 2 $\mu$m; gel content, 43% by weight; a trial product of NIPPON ZEON Co., Ltd.
[7] Zeon 121: a polyvinyl chloride resin; average diameter of single particles, 1 $\mu$m; weight-average molecular weight, 1,700; a product of NIPPON ZEON Co., Ltd.
[8] Percure O: a curing agent; t-butyl peroxy-2-ethylhexanoate; half-life, 65° C. × 24 hours; a product of NIPPON YUSHI Co., Ltd.
[9] Percadox 16: a curing agent; bis-4-t-butylcylcohexyl peroxydicarbonate; half-life, 40° C. × 10 hours; a product of KASEI AKZO Co., Ltd.
[10] Stearic acid: a mold release agent; a product of SAKAI KAGAKU KOGYO Co., Ltd.
[11] NS-100: a filler; calcium carbonate; a product of NITTO FUNKA KOGYO Co., Ltd.

EXAMPLE 8

Unsaturated polyester resin 1 in an amount of 65 parts by weight, 20 parts by weight of Zeon R-103, 10 parts by weight of Zeon F-320, 35 parts by weight of styrene, 30 parts by weight of glass chops (the diameter, 13 $\mu$m; and the length, 1 inch), 2 parts by weight of t-butyl peroxy-2-ethylhexanoate (Percure O; a product of NIPPON YUSHI Co., Ltd.), and 1 part by weight of bis-4-t-butylcyclohexyl peroxydicarbonate (Percadox 16; a product of KASEI AKZO Co., Ltd.) were dispersed and mixed at a room temperature. The obtained composition was continuously applied to a polypropylene film (a release film) to form a coating layer of a width of 200 mm×a length of 320 mm×a thickness of 1 mm. The upper surface and the lower surface of the prepared sheet were covered with a polypropylene film. Twenty sheets of this film were prepared. After the above composition was kept at a room temperature for a week, 20 sheets of SMC were additionally prepared.

Figure 2:
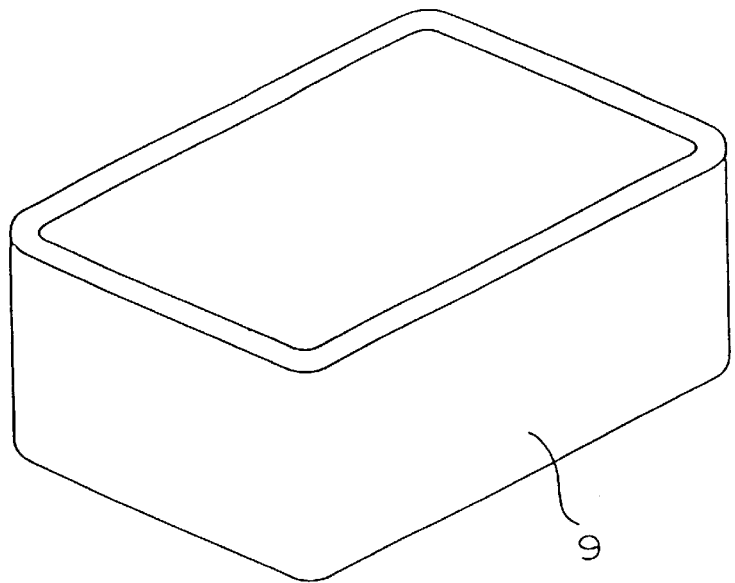
FIG. 2 shows a perspective view of a mold for a vessel made of an epoxy resin, such as a bath tub.
Figure 3:
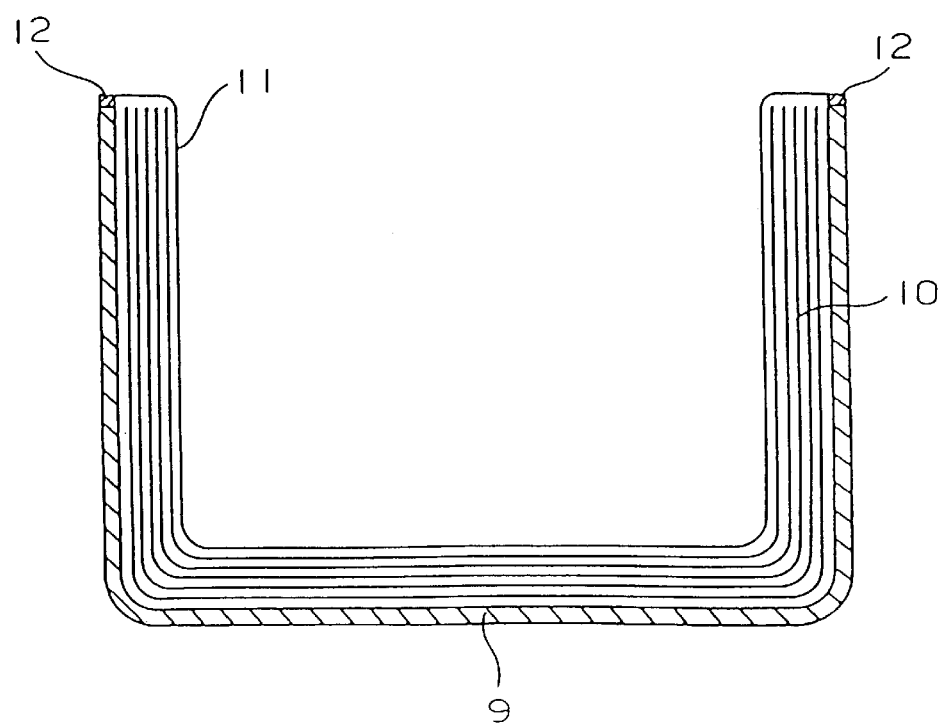
FIG. 3 shows a sectional view of the mold shown in FIG. 2 in the condition that the mold is filled with SMC.

FIG. 2 shows a perspective view of a mold for a vessel made of an epoxy resin, such as a bath tub. FIG. 3 shows a sectional view of the mold shown in FIG. 2 in the condition that the mold is filled with SMC. On the inner surface of the mold (having inner sizes of a length of 200 mm, a width of 300 mm, and a depth of 150 mm, with a curved surface at the bottom) for a vessel, such as a bath tub, made of a epoxy resin shown in FIG. 2, a silicone wax was applied. After the release films on the both sides of the SMC prepared above were removed, the SMC 10 was attached to the treated surface so that five layers were formed. Pieces of the SMC formed by cutting with scissors were also used where necessary. The attached layers of SMC were covered with a polypropylene film 11, and the end parts were fixed with a rubbery pressure-sensitive adhesive of a gel form 12 as shown in FIG. 3. Then, a hole was made at a part in the rubbery pressure-sensitive adhesive, and a silicone rubber tube connected to a vacuum pump was inserted through the hole. The whole combination of the resin and the mold was placed in an electric oven and kept under 10 Torr for 30 minutes while being heated to 80° C. Then, the combination of the resin and the mold was taken out from the oven, and the molded product was taken out from the mold. The molded product faithfully reproduced the inner shape of the mold.

SYNTHESIS EXAMPLE 1 (Ionically crosslinked powder of a copolymer resin)

A polymerization reactor was charged with a monomer shown in the core of Table 3 in an amount shown also in Table 3, 150 parts by weight of water, 1.0 part by weight of sodium alkylsulfates having 12 to 18 carbon atoms, 0.3 parts by weight of t-dodecylmercaptan, and 0.1 part by weight of potassium persulfate, and the emulsion polymerization of the obtained mixture was allowed to proceed at 70° C. When the conversion of the polymerization reached 98%, the polymerization was temporarily stopped by cooling. Then, among the monomers shown in the shell of Table 3, methyl methacrylate was added in an amount shown in Table 3 in terms of the part by weight, and the polymerization was resumed at 70° C. When 50% of the added methyl methacrylate had polymerized, methacrylic acid shown in Table 3 was continuously added in 3 hours to allow the reaction to proceed. When the overall conversion of the polymerization reached to 96%, the polymerization reaction was finished by cooling.

To the latex obtained after the polymerization, 100 parts by weight of a 1% by weight aqueous solution of potassium hydroxide was added at a room temperature, and the resultant mixture was stirred for 30 minutes. Then, the obtained latex was dried with a hot air of 150° C. by a spray drier to obtain resin powder (a) and resin powder (b) which had been ionically crosslinked. Resin powders (a) and (b) had average diameters of single particles of 0.3 $\mu$m and 0.2 $\mu$m, respectively.

TABLE 3

| ionically crosslinked resin powder | (a) | (b) |
|---|---|---|
| core | | |
| monomer (part by weight) | | |
| n-butyl acrylate | 39.3 | — |
| butadiene | — | 39.3 |
| divinylbenzene | 0.7 | 0.7 |
| glass transition temperature (° C.) | −45 | −70 |
| shell | | |

TABLE 3-continued

| ionically crosslinked resin powder | (a) | (b) |
|---|---|---|
| monomer (part by weight) | | |
| methyl methacrylate | 58 | 58 |
| methacrylic acid | 2 | 2 |
| glass transition temperature (° C.) | 105 | 105 |
| potassium hydroxide (part by weight) | 1 | 1 |
| average diameter of single particles ($\mu$m) | 0.3 | 0.2 |

In Examples 9 to 13 and Comparative Examples 8 to 16, the evaluations were conducted in accordance with the following methods.

(1) Viscosity characteristic of SMC after the preparation thereof

An SMC was matured at 40° C. for 15 hours. When the SMC remained flexible, it is shown by the mark ◯, and when the SMC became hard, it is shown by the mark x.

(2) Cleavage of a release film

An SMC was matured at 40° C. for 15 hours and then kept under the condition of a temperature of 25° C. and a relative humidity of 60% for 1 hour. The release film was cleaved from the conditioned SMC by hands, and the cleavage of the release film was evaluated in accordance with the following criterion:

◯: easily cleaved; no attachment of SMC components on the release film

Δ: less easily cleaved than the above; no attachment of SMC components on the release film x: not easily cleaved; or SMC components attached to the release film even when easily cleaved (3) Storage stability of a sheet An SMC was press molded by using a rectangular mold having such a size that the SMC sheet occupied the area of 11% of the mold. The uniformity of the distribution of the SMC was evaluated by comparing the thickness of the resin at the central part of the mold and the thickness of the resin at a peripheral part of the mold in accordance with the following criterion:

◯: no difference in the thickness at the central part and at a peripheral part

Δ: the thickness at a peripheral part slightly smaller than that at the central part x: apparent difference found between the thickness at the central part and the thickness at a peripheral part (5) Bending strength and bending modulus A test piece having a width of 10 mm, a length of 100 mm, and a height of 4 mm was prepared by milling from a flat plate which had been molded under the press condition shown in Table 4, and the bending strength and the bending modulus were measured in accordance with the method of Japanese Industrial Standard K 6911.

(6) Volume shrinkage

The volume shrinkage was obtained as the percentage of a value obtained by subtracting the specific gravity of a composition before curing from the specific gravity of a resin prepared by curing the composition based on the specific gravity of a resin prepared by curing the composition.

EXAMPLES 9 TO 13 AND COMPARATIVE EXAMPLE 8 TO 16

The components shown in Table 4 were mixed together by using a kneader at a room temperature. Within one hour after the mixing, the obtained mixture was spread between two polypropylene films by using an SMC machine to prepare a sheet having a width of 200 mm, a length of 300 mm, and a thickness of 2 mm, and the obtained sheet was matured at 40° C. for 15 hours. After the maturing, the sheet was examined with respect to the increase in the viscosity and the cleavage of the release films. The sheet was further matured at 40° C. for a total time of 24 hours. The SMC sheet after the maturing was press cured by using a rectangular mold having such a size that the charged area of the SMC sheet occupied 11% of the mold under the condition shown in Table 4. The packing property was observed, and the bending strength, the bending modulus, and the volume shrinkage of the obtained molded product were measured. The results are shown in Table 4.

TABLE 4

| Example | | 9 | 10 | 11 | 12 | 13 |
|---|---|---|---|---|---|---|
| Formulation (part by weight) | | | | | | |
| (A) | unsaturated polyester resin[1] | 65 | 65 | 65 | 65 | 65 |
| (B) | core/shell resin powder | | | | | |
| | type | (a) | (a) | (a) | (a) | (b) |
| | amount | 30 | 30 | 30 | 30 | 30 |
| (C) | styrene monomer | 35 | 35 | 35 | 35 | 35 |
| (D) | Percure O[2] | 2 | 2 | 2 | 2 | 2 |
| | Percadox 16[3] | 1 | 1 | 1 | 1 | 1 |
| others | | | | | | |
| glass fiber[4] | | — | 25 | 25 | 25 | 25 |
| MgO #40[5] | | — | — | — | — | — |
| SZ-2000[6] | | 4 | 4 | 4 | 4 | 4 |
| NS-100[7] | | — | — | 130 | — | — |
| SMC | | | | | | |
| viscosity characteristic of SMC after the preparation | | ◯ | ◯ | ◯ | ◯ | ◯ |
| cleavage of release film | | ◯ | ◯ | ◯ | ◯ | ◯ |
| storage stability of sheet (day) | | >90 | >90 | >90 | >90 | >90 |
| condition of pressing | | | | | | |
| temperature (° C.) | | 90 | 90 | 90 | 140 | 140 |
| pressure (kg/cm$^2$) | | 5 | 5 | 5 | 80 | 80 |
| physical properties | | | | | | |
| packing in molding | | ◯ | ◯ | ◯ | ◯ | ◯ |
| bending strength (kg/cm$^2$) | | 1200 | 2800 | 2700 | 3200 | 3300 |
| bending modulus (kg/cm$^2$) | | 740 | 1620 | 1510 | 1770 | 1840 |
| volume shrinkage (%) | | 0.6 | 0.3 | 0.1 | 0.3 | 0.4 |

| Comparative Example | 8 | 9 | 10 | 11 | 12 | 13 | 14 |
|---|---|---|---|---|---|---|---|
| Formulation (part by weight) | | | | | | | |
| (A) unsaturated polyester resin[1] | 65 | 65 | 65 | 65 | 65 | 65 | 65 |
| (B) core/shell resin powder | | | | | | | |
| type | — | — | — | — | — | — | — |
| amount | — | — | — | — | — | — | — |
| (C) styrene monomer | 35 | 35 | 35 | 35 | 35 | 35 | 35 |
| (D) Percure O[2] | 2 | 2 | 2 | 2 | 2 | 2 | 22 |
| Percadox 16[3] | 1 | 1 | 1 | 1 | 1 | 1 | 1 |
| others | | | | | | | |
| glass fiber[4] | — | — | — | 25 | 25 | 25 | 25 |
| MgO #40[5] | — | 10 | 10 | 10 | 10 | 10 | 10 |
| SZ-2000[6] | 4 | 4 | 4 | 4 | 4 | 4 | 4 |
| NS-100[7] | — | — | 130 | 130 | 130 | 130 | 130 |
| SMC | | | | | | | |
| viscosity characteristic of SMC after the preparation | x | x | ◯ | ◯ | ◯ | ◯ | ◯ |
| cleavage of release film | — | — | x | ◯ | ◯ | ◯ | ◯ |
| storage stability of sheet (day) | — | — | <3 | <3 | <3 | <3 | <3 |

TABLE 4-continued condition of pressing

| | | | | | | | |
|---|---|---|---|---|---|---|---|
| temperature (° C.) | — | — | 140 | 90 | 140 | 90 | 140 |
| pressure (kg/cm$^2$) | — | — | 80 | 5 | 5 | 80 | 80 | physical properties

| | | | | | | | |
|---|---|---|---|---|---|---|---|
| packing in molding | — | — | Δ | x | x | x | Δ |
| bending strength (kg/cm$^2$) | — | — | 600 | — | — | — | 1400 |
| bending modulus (kg/cm$^2$) | — | — | 310 | — | — | — | 1040 |
| volume shrinkage (%) | — | — | 7.5 | — | — | — | — |

Notes to Table 4
1) 1)Unsaturated polyester resin: a random copolymer having a composition of propylene glycol/neopentyl glycol/isophthalic acid/fumaric acid = 30/70/40/60 mol %; number-average molecular weight, 3,300.
2)Percure O: a curing agent; t-butyl peroxy-2-ethylhexanoate; half-life, 65° C. × 24 hours; a product of NIPPON YUSHI Co., Ltd.
3)Percadox 16: a curing agent; bis(4-t-butylcylcohexyl) peroxydicarbonate; half-life, 40° C. × 10 hours; a product of KASEI AKZO Co., Ltd.
4)Glass fiber: chopped strands; diameter, 13 μm; cut length, 1 inch; a product of NITTO BOSEKI Co., Ltd.
5)MgO #40: magnesium oxide; a product of KYOWA KAGAKU Co., Ltd.
6)SZ-2000: zinc stearate; a product of SAKAI KAGAKU KOGYO Co., Ltd.
7)NS-100: a filler; calcium carbonate; a product of NITTO FUNKA KOGYO Co., Ltd.

The compositions in Examples 9 to 13 which were obtained by using the unsaturated polyester resin compositions of the present invention had a viscosity of 5,000,000 cps or more after maturing of the SMC, remained flexible, and showed excellent cleavage of the release film while the viscosity of the composition was kept to less than 50,000 cps until the SMC was prepared and before the SMC was matured. These SMC could be molded without problem at the low temperature under the low pressure or at the high temperature under the high pressure. The molded product showed a high bending strength and a high bending modulus.

When a powder of a resin was not mixed as shown in Comparative Examples 8 and 9, the prepared SMC showed significant increase in the viscosity to become hard materials both in the presence and in the absence of magnesium oxide.

In Comparative Example 10, the composition containing no glass fiber was prepared. The composition showed inferior cleavage of the release film because glass fiber was not mixed in addition to the powder of a resin.

In Comparative Examples 11 to 14, the compositions were typical conventional SMC compositions prepared by mixing glass fiber and magnesium oxide without mixing a powder of a resin. These compositions had an allowable period for storage as short as less than 3 days. When the pressing was conducted under the condition of the low temperature and the low pressure, under the condition of the high temperature and the low pressure, or under the condition of the low temperature and the high pressure, the compositions could not be distributed throughout the whole parts of the mold to cause insufficient packing. The compositions could be distributed throughout the whole parts of the mold only when the molding was conducted at the high temperature under the high pressure. However, the thickness showed difference at the central part and at a peripheral part even in this case.

In both of Example 9 and Comparative Example 10, the compositions containing no glass fiber were prepared. It can be understood by comparing the results of these examples that the molded product of Example 9 obtained by using the composition of the present invention in which the ionically crosslinked powder of the resin was mixed together had a higher bending strength, a higher bending modulus, and a lower volume shrinkage than those of the molded product of Comparative Example 10. In both of Example 12 and Comparative Example 14, the compositions containing glass fiber were prepared. It can also be understood by comparing the results of these examples that the molded product of Example 12 obtained by using the composition of the present invention in which the ionically crosslinked powder of the resin was mixed together had a remarkably higher bending strength and a remarkably higher bending modulus than those of the molded product of Comparative Example 14.

In Examples 14 to 17, Reference Examples 3 and 4, and Comparative Examples 17 to 19, the evaluations were conducted in accordance with the following methods.

(1) Viscosity characteristic of SMC after the preparation thereof

○: less than 10,000 cps before application to a release film by an SMC machine; and 5,000,000 cps or more by maturing for 1 day after the preparation of SMC Δ: 10,000 cps or more and less than 100,000 cps before application to a release film by an SMC machine; or 1,000,000 cps or more and less than 5,000,000 by maturing for 1 day after the preparation of SMC x: 100,000 cps or more before application to a release film by an SMC machine; or less than 1,000,000 cps by maturing for 1 day after the preparation of SMC (2) Storage stability of a sheet An SMC sheet was kept at 20° C. after being prepared. Molded products were prepared at 140° C. under 80 kg/cm$^2$ from time to time by using a part of the SMC sheet, and the bending strength of the prepared molded products was measured. The number of day during which the sheet kept the original flexibility and the original cleavage of the release film and the change in the bending strength remained within 5% of the original value obtained immediately after the preparation of the SMC was used as the value representing the storage stability.

(3) Cleavage of a release film

An SMC was matured at 40° C. for 24 hours and then placed under the condition of a temperature of 25° C. and a relative humidity of 60% for 1 hour. The release film was cleaved from the conditioned SMC by hands, and the cleavage was evaluated in accordance with the following criterion:

○: easily cleaved; no components of the resin composition attached on the release film Δ: easily cleaved; a small amount of the components of the resin composition attached to the release film x: not easily cleaved; a large amount of the components of the resin composition attached to the release film (4) Fluidity during press molding The condition of an SMC during the compression molding under the condition shown in Table 5 for 20 minutes was observed and evaluated by the following criterion.

○: good packing and lamination in a mold

Δ: inferior in either one of the packing and the lamination in a mold x: extremely inferior in either one of the packing and the lamination in a mold (5) Bending strength of a press molded product Five sheets of an SMC prepared to a thickness of 1.0 mm was laminated, and the obtained laminate was press molded to prepare a flat plate. From the obtained flat plate, a test piece having a size of 10×100×4 mm was prepared, and the bending strength of the test piece was measured in accordance with the method of Japanese Industrial Standard K6911.

(6) Storage stability of the initial mixture at 20° C.

This shows the storage stability of the mixture before the treatment by an SMC machine, and is represented by the number of day during which the change in the viscosity remained within 5% while the mixture is kept at 20° C.

EXAMPLES 14 TO 15

The components for Examples 14 or 15 shown in Table 5 were mixed together by using a kneader at a room temperature for 20 minutes except for powder of an acrylic resin used as the thickening agent and glass fiber. The obtained mixture was applied to two separate release films made of polypropylene to coat the films. On the mixtures applied to the films, the powder of the acrylic resin was continuously spread by a dispenser, and a roving of glass fiber was successively spread on the acrylic resin while being chopped to a length of 1 inch. The sheets prepared above were put together in such a manner that the coated faces were attached together by using an SMC machine. The sheet having the sandwiched coating layer containing the powder of the acrylic resin and the glass fiber between the polypropylene films was wound up and matured at 30° C. for 15 hours to prepare an SMC sheet. The unsaturated polyester resin compositions for Examples 14 and 15 had viscosities of 4,200 cps and 4,100 cps, respectively, immediately before being applied by the SMC machine, and viscosities of 5,500,000 cps and 5,100,000 cps, respectively, after the maturing was finished. Each SMC was kept for 1 week and laminated to form a laminate of 5 layers after removing the release film. Each of the laminates was molded under the press condition of a low temperature and a low pressure as well as under the press condition of a high temperature and a high pressure as shown in Table 5. Both sheet compositions had excellent fluidity. Even when the composition was molded in the form of the laminate of 5 layers, the obtained bending strength was the same as that of the conventional sample which was obtained by using magnesium oxide as the thickening agent and by molding at a high temperature under a high pressure in Comparative Example 15, and the integration of the layers was also found to be sufficient. In other words, sufficient physical properties could be exhibited by molding at a low temperature under a low pressure as well as by molding at a high temperature under a high pressure.

The SMC kept at 20° C. for 30 days held sufficient flexibility and showed good cleavage of the release film. In these examples, the mixture before the application for coating had an excellent storage stability because no thickening agent had been added in the initial stage of mixing, and the preparation of the SMC was possible without any problem even when one month or more passed before the treatment by the SMC machine after the initial mixing.

EXAMPLES 16 AND 17

The same procedures as those conducted in Examples 14 and 15 were conducted except that the powder of the acrylic resin was added simultaneously with the glass fiber. The bending strength showed practically sufficient values although the tendency to be somewhat inferior to the bending strength in Examples 14 and 15 was shown because the powder of the acrylic resin and the glass fiber were added simultaneously and the uniformity of dispersion was somewhat inferior. All the other results of the evaluations were the same as those in Examples 14 and 15.

EXAMPLES 18 AND 19

The same procedures as those conducted in Examples 14 were conducted except that the addition of the powder of the acrylic resin was conducted simultaneously with the initial mixing by using a kneader. The bending strength was somewhat higher than that in Example 14 because the uniformity of the dispersion of the acrylic resin was sufficient. However, by the effect of the powder of the acrylic resin used here to increase the viscosity, the viscosity of the mixture rapidly increased to 100,000 to 1,000,000 cps in 3 to 6 hours after the mixing at a room temperature. Therefore, it was necessary for adding glass fiber that the preparation of SMC be surely conducted within several hours. Removing the materials adhered to the inside of the mixer was difficult when the viscosity was increased, and this gave rise to a drawback about the operation in that cleaning must be conducted simultaneously with the preparation of the SMC.

COMPARATIVE EXAMPLE 15

In this example, magnesium oxide was used as the thickening agent in place of the powder of the acrylic acid used in Example 14. The condition for the preparation of SMC was the same as that in Example 18. Because magnesium oxide works as a reaction accelerator for a catalyst active at a low temperature, the used catalyst was limited to that active at a high temperature in order to prevent solidification of the SMC during storage in a short time. Moreover, because a high viscosity sufficient for the preparation of an SMC could not be obtained by using magnesium oxide alone, calcium carbonate was added as a filler in a required amount. The composition in the present example could not be molded at a high temperature under a low pressure, and the molding was conducted at a high temperature under a high pressure.

COMPARATIVE EXAMPLES 16 AND 17

The same procedures as those conducted in Comparative Example 15 were conducted by using the same formulation as that in Comparative Example 15 except that the addition of magnesium oxide was conducted before or simultaneously with the addition of glass fiber. In the both comparative examples, dispersion of magnesium oxide was inferior, and a longer time was required for increasing the viscosity because magnesium oxide could not spontaneously be dispersed in the coating layer of the unsaturated polyester resin mixture. Therefore, preparation of a suitable SMC was not possible, and the molding process could not be conducted.

TABLE 5

| Example | 14 | 15 | 16 | 17 | 18 | 19 |
|---|---|---|---|---|---|---|
| position of addition of thickening agent in FIG. 1 | y | y | z | z | x | x |
| Formulation (part by weight) | | | | | | |
| (A) unsaturated polyester resin[1] | 65 | 65 | 65 | 65 | 65 | 65 |
| (B) powder of acrylic resin[2] | 30 | 30 | 30 | 30 | 30 | 30 |
| (C) styrene | 35 | 35 | 35 | 35 | 35 | 35 |
| (D) Percure O[3] | 1.5 | — | 1.5 | — | 1.5 | — |
| Percadox 16[4] | 0.7 | — | 0.7 | — | 0.7 | — |
| Perbutyl Z[5] | — | 1.0 | — | 1.0 | — | 1.0 |
| others | | | | | | |
| glass fiber[6] | 25.0 | 25.0 | 25.0 | 25.0 | 25.0 | 25.0 |
| MgO #40[7] | — | — | — | — | — | — |
| SZ-2000[8] | 3.0 | 3.0 | 3.0 | 3.0 | 3.0 | 3.0 |
| NS-100[9] | — | — | — | — | — | — |

TABLE 5-continued

| SMC | | | | | | |
|---|---|---|---|---|---|---|
| viscosity characteristic of SMC after the preparation | ○ | ○ | ○ | ○ | ○ | ○ |
| storage stability of film (day) | >30 | >30 | >30 | >30 | >30 | >30 |
| cleavage of release film | ○ | ○ | ○ | ○ | ○ | ○ |
| fluidity during press molding | | | | | | |
| 80° C. × 5 kg/cm² | ○ | — | ○ | — | ○ | — |
| 140° C. × 80 kg/cm² | — | ○ | — | — | — | ○ |
| 140° C. × 5 kg/cm² | — | — | — | ○ | — | — |
| bending strength (kg/cm²) | 1210 | 1350 | 1140 | 1270 | 1320 | 1480 |
| storage stability of the initial mixture (day) | >30 | >60 | >30 | >60 | <0.3 | <0.3 |

| Comparative Example | 15 | 16 | 17 |
|---|---|---|---|
| position of addition of thickening agent in FIG. 1 | x | y | z |
| Formulation (part by weight) | | | |
| (A) unsaturated polyester resin¹⁾ | 65 | 65 | 65 |
| (B) powder of acrylic resin²⁾ | — | — | — |
| (C) styrene | 35 | 35 | 35 |
| (D) Percure O³⁾ | — | — | — |
| Percadox 16⁴⁾ | — | — | — |
| Perbutyl Z⁵⁾ | 1.0 | 1.0 | 1.0 |
| others | | | |
| glass fiber⁶⁾ | 25.0 | 25.0 | 25.0 |
| MgO #40⁷⁾ | 6.0 | 6.0 | 6.0 |
| SZ-2000⁸⁾ | 3.0 | 3.0 | 3.0 |
| NS-100⁹⁾ | 130.0 | 130.0 | 130.0 |
| SMC | | | |
| viscosity characteristic of SMC after preparation | Δ | x | x |
| storage stability of film (day) | >30 | x | x |
| cleavage of release film | Δ | x | x |
| fluidity during press molding | | | |
| 80° C. × 5 kg/cm² | — | — | — |
| 140° C. × 80 kg/cm² | ○ | — | — |
| 140° C. × 5 kg/cm² | x | — | — |
| bending strength (kg/cm²) | 1380 | — | — |
| storage stability of the initial mixture (day) | <1 | >60 | >60 |

Notes to Table 5
¹⁾Unsaturated polyester resin: a random copolymer having a composition of propylene glycol/ethylene glycol/phthalic anhydride/fumaric acid = 60/40/60/40 mol %; number-average molecular weight, 2,100.
²⁾Powder of acrylic resin: polymethyl methacrylate; an average diameter of single crystals, 1.9 μm; Zeon F-320.
³⁾Percure O: a curing agent; t-butyl peroxy-2-ethylhexanoate; half-life, 65° C. × 24 hours; a product of NIPPON YUSHI Co., Ltd.
⁴⁾Percadox 16: a curing agent; bis-4-t-butylcylcohexyl peroxydicarbonate; half-life, 40° C. × 10 hours; a product of KASEI AKZO Co., Ltd.
⁵⁾Perbutyl Z: a curing agent; t-butyl peroxybenzoate; half-life, 105° C. × 8.9 hours; a product of NIPPON YUSHI Co., Ltd.
⁶⁾Glass fiber: chopped strands; diameter, 13 μm; cut length, 1 inch; a product of NITTO BOSEKI Co., Ltd.
⁷⁾MgO #40: magnesium oxide; a product of KYOWA KAGAKU Co., Ltd.
⁸⁾SZ-2000: a mold release agent; zinc stearate; a product of SAKAI KAGAKU KOGYO Co., Ltd.
⁹⁾NS-100: a filler; calcium carbonate; a product of NITTO FUNKA KOGYO Co., Ltd.

INDUSTRIAL APPLICABILITY

The unsaturated polyester resin composition of the present invention can be made into SMC in a short time and provides SMC which has an excellent storage stability, shows no problem on cleavage of release films, and can be molded at a low temperature under a low pressure.

The composition of the present invention provides a molded product which is excellent in the low shrinkage and in the surface smoothness by using any molding process. Therefore, the composition can advantageously be applied in a wide variety of fields, such as bath tubs, building materials, electric parts, and automobile parts. The SMC sheet of the present invention is excellent in reproducing the shape of a mold because the composition has a high fluidity when heated, and it is made possible that the vacuum molding and the compressed air molding of the composition are conducted.

The SMC prepared by using the unsaturated polyester resin composition of the present invention in which the ionically crosslinked core/shell powder of a copolymer resin is mixed together is particularly excellent in the thickening property and in the storage stability, shows excellent packing into a mold under a condition of a low temperature and a low pressure, provides a molded product having a high strength and a high modulus, and exhibits a small volume shrinkage by molding.

We claim:

1. A process for producing a sheet molding compound of an unsaturated polyester resin comprising coating one or both of two release films with an unsaturated polyester resin composition for molding comprising (A) 100 parts by weight of an unsaturated polyester resin, (B) 20 to 120 parts by weight of a thickening agent containing, as the effective component thereof, (1) powder of a resin containing 50% by weight or more of at least one type of monomer unit selected from the group consisting of esters of acrylic acid, esters of methacrylic acid, and aromatic vinyl compounds or (2) powder of a copolymer resin prepared by ionically crosslinking particles of a core/shell copolymer by addition of a metal cation, the core/shell copolymer comprising (a) a core which comprises at least one member selected from the group consisting of (i) a polymer of an ester of acrylic acid or an ester of methacrylic acid having a glass transition temperature of −30° C. or lower and (ii) a polymer of a diene having a glass transition temperature of −30° or lower and (b) a shell which comprises a copolymer of (i) a monomer of an ester of acrylic acid or an ester of methacrylic acid and (ii) a monomer of a radical polymerizable unsaturated carboxylic acid having free carboxyl group and has a glass transition temperature of 70° C. or higher, (C) 30 to 120 parts by weight of a liquid polymerizable monomer, (D) a curing agent, and (F) less than 100 parts by weight of an inorganic filler, spreading (E) a reinforcing material on the coated release films, bringing the two release films attached to each other in such a manner that the coated sides are placed between the two release films, and rolling the obtained laminate.

2. A process for molding an unsaturated polyester resin molding material comprising placing a sheet molding compound comprising (A) 100 parts by weight of an unsaturated polyester resin, (B) 20 to 120 parts by weight of a thickening agent containing, as the effective component thereof, (1) powder of a resin containing 50% by weight or more of at least one type of monomer unit selected from the group consisting of esters of acrylic acid, esters of methacrylic acid, and aromatic vinyl compounds or (2) powder of a copolymer resin prepared by ionically crosslinking particles of a core/shell copolymer by addition of a metal cation, the core/shell copolymer comprising (a) a core which comprises at least one member selected from the group consisting of (i) a polymer of an ester of acrylic acid or an ester of methacrylic acid having a glass transition temperature of −30° C. or lower and (ii) a polymer of a diene having a glass transition temperature of −30° or lower and (b) a shell which comprises a copolymer of (i) a monomer of an ester of acrylic acid or an ester of methacrylic acid and (ii) a monomer of a radical polymerizable unsaturated carboxylic acid having free carboxyl group and has a glass transition temperature of 70° C. or higher, (C) 30 to 120 parts by weight of a liquid polymerizable monomer, (D) a curing agent, and (E) a reinforcing material into a mold and compression molding the sheet molding compound at 40 to 100° C. under 0.1 to 10 kgf/cm² (gauge pressure) to obtain a molded product.

3. A process for molding an unsaturated polyester resin molding material comprising placing a sheet molding compound comprising (A) 100 parts by weight of an unsaturated polyester resin, (B) 20 to 120 parts by weight of a thickening agent containing, as the effective component thereof, (1) powder of a resin containing 50% by weight or more of at least one type of monomer unit selected from the group consisting of esters of acrylic acid, esters of methacrylic acid, and aromatic vinyl compounds or (2) powder of a copolymer resin prepared by ionically crosslinking particles of a core/shell copolymer by addition of a metal cation, the core/shell copolymer comprising (a) a core which comprises at least one member selected from the group consisting of (i) a polymer of an ester of acrylic acid or an ester of methacrylic acid having a glass transition temperature of −30° C. or lower and (ii) a polymer of a diene having a glass transition temperature of −30° or lower and (b) a shell which comprises a copolymer of (i) a monomer of an ester of acrylic acid or an ester of methacrylic acid and (ii) a monomer of a radical polymerizable unsaturated carboxylic acid having free carboxyl group and has a glass transition temperature of 70° C. or higher, (C) 30 to 120 parts by weight of a liquid polymerizable monomer, (D) a curing agent, (E) a reinforcing material, and (F) less than 100 parts by weight of an inorganic filler into a mold, bringing the sheet molding compound tightly attached to the surface of the mold under −760 to −50 mmHg, and subsequently or simultaneously heating the sheet molding compound to 50 to 150° C. to obtain a molded product.

4. A process for molding an unsaturated polyester resin molding material comprising placing a sheet molding compound comprising (A) 100 parts by weight of an unsaturated polyester resin, (B) 20 to 120 parts by weight of a thickening agent containing, as the effective component thereof, (1) powder of a resin containing 50% by weight or more of at least one type of monomer unit selected from the group consisting of esters of acrylic acid, esters of methacrylic acid, and aromatic vinyl compounds or (2) powder of a copolymer resin prepared by ionically crosslinking particles of a core/shell copolymer by addition of a metal cation, the core/shell copolymer comprising (a) a core which comprises at least one member selected from the group consisting of (i) a polymer of an ester of acrylic acid or an ester of methacrylic acid having a glass transition temperature of −30° C. or lower and (ii) a polymer of a diene having a glass transition temperature of −30° or lower and (b) a shell which comprises a copolymer of (i) a monomer of an ester of acrylic acid or an ester of methacrylic acid and (ii) a monomer of a radical polymerizable unsaturated carboxylic acid having free carboxyl group and has a glass transition temperature of 70° C. or higher, (C) 30 to 120 parts by weight of a liquid polymerizable monomer, (D) a curing agent, (E) a reinforcing material, and (F) less than 100 parts by weight of a inorganic filler into a mold, bringing the sheet molding compound tightly attached to the surface of the mold by application of an air pressure of 1 to 5 kgf/cm² (gauge pressure), and subsequently or simultaneously heating the sheet molding compound to 50 to 150° C. to obtain a molded product.

5. A process for molding an unsaturated polyester resin molding material comprising placing 2 to 10 sheets of a sheet molding compound comprising (A) 100 parts by weight of an unsaturated polyester resin, (B) 20 to 120 parts by weight of a thickening agent containing, as the effective component thereof, (1) powder of a resin containing 50% by weight or more of at least one type of monomer unit selected from the group consisting of esters of acrylic acid, esters of methacrylic acid, and aromatic vinyl compounds or (2) powder of a copolymer resin prepared by ionically crosslinking particles of a core/shell copolymer by addition of a metal cation, the core/shell copolymer comprising (a) a core which comprises at least one member selected from the group consisting of (i) a polymer of an ester of acrylic acid or an ester of methacrylic acid having a glass transition temperature of −30° C. or lower and (ii) a polymer of a diene having a glass transition temperature of −30° or lower and (b) a shell which comprises a copolymer of (i) a monomer of an ester of acrylic acid or an ester of methacrylic acid and (ii) a monomer of a radical polymerizable unsaturated carboxylic acid having free carboxyl group and has a glass transition temperature of 70° C. or higher, (C) 30 to 120 parts by weight of a liquid polymerizable monomer, (D) a curing agent, and (E) a reinforcing material into a mold to form a laminate and compression molding the laminate at 40 to 100° C. under 0.1 to 10 kgf/cm² (gauge pressure) to obtain a molded product.

6. A process for molding an unsaturated polyester resin molding material comprising placing 2 to 10 sheets of a sheet molding compound comprising (A) 100 parts by weight of an unsaturated polyester resin, (B) 20 to 120 parts by weight of a thickening agent containing, as the effective component thereof, (1) powder of a resin containing 50% by weight or more of at least one type of monomer unit selected from the group consisting of esters of acrylic acid, esters of methacrylic acid, and aromatic vinyl compounds or (2) powder of a copolymer resin prepared by ionically crosslinking particles of a core/shell copolymer by addition of a metal cation, the core/shell copolymer comprising (a) a core which comprises at least one member selected from the group consisting of (i) a polymer of an ester of acrylic acid or an ester of methacrylic acid having a glass transition temperature of −30° C. or lower and (ii) a polymer of a diene having a glass transition temperature of −30° or lower and (b) a shell which comprises a copolymer of (i) a monomer of an ester of acrylic acid or an ester of methacrylic acid and (ii) a monomer of a radical polymerizable unsaturated carboxylic acid having free carboxyl group and has a glass transition temperature of 70° C. or higher, (C) 30 to 120 parts by weight of a liquid polymerizable monomer, (D) a curing agent, (E) a reinforcing material, and (F) less than 100 parts by weight of a inorganic filler into a mold to form a laminate, bringing the laminate tightly attached to the surface of the mold under −760 to −50 mmHg, and subsequently or simultaneously heating the laminate to 50 to 150° C. to obtain a molded product.

7. A process for molding an unsaturated polyester resin molding material comprising placing 2 to 10 sheets of a sheet molding compound comprising (A) 100 parts by weight of an unsaturated polyester resin, (B) 20 to 120 parts by weight of a thickening agent containing, as the effective component thereof, (1) powder of a resin containing 50% by weight ore more of at least one type of monomer unit selected from the group consisting of esters of acrylic acid, esters of methacrylic acid, and aromatic vinyl compounds or (2) powder of a copolymer resin prepared by ionically crosslinking particles of a core/shell copolymer by addition of a metal cation, the core/shell copolymer comprising (a) a core which comprises at least one member selected from the group consisting of (i) a polymer of an ester of acrylic acid or an ester of methacrylic acid having a glass transition temperature of −30° C. or lower and (ii) a polymer of a diene having a glass transition temperature of −30° or lower and (b) a shell which comprises a copolymer of (i) a monomer of an ester of acrylic acid or an ester of methacrylic acid and (ii) a monomer of a radical polymerizable unsaturated carboxylic acid having free carboxyl group and has a glass transition temperature of 70° C. or higher, (C) 30 to 120 parts by weight of a liquid polymerizable monomer, (D) a curing agent, (E) a reinforcing material, and (F) less than 100 parts by weight of a inorganic filler into a mold to form a laminate, bringing the laminate tightly attached to surface of the mold by application of an air pressure of 1 to 5 kgf/cm$^2$ (gauge pressure), and subsequently or simultaneously heating the laminate to 50 to 150° C. to obtain a molded product.

8. A process for molding an unsaturated polyester resin molding material comprising placing a bulk molding compound comprising (A) 100 parts by weight of an unsaturated polyester resin, (B) 20 to 120 parts by weight of a thickening agent containing, as the effective component thereof, (1) powder of a resin containing 50% by weight or more of at least one type of monomer unit selected from the group consisting of esters of acrylic acid, esters of methacrylic acid, and aromatic vinyl compounds or (2) powder of a copolymer resin prepared by ionically crosslinking particles of a core/shell copolymer by addition of a metal cation, the core/shell copolymer comprising (a) a core which comprises at least one member selected from the group consisting of (i) a polymer of an ester of acrylic acid or an ester of methacrylic acid having a glass transition temperature of −30° C. or lower and (ii) a polymer of a diene having a glass transition temperature of −30° or lower and (b) a shell which comprises a copolymer of (i) a monomer of an ester of acrylic acid or an ester of methacrylic acid and (ii) a monomer of a radical polymerizable unsaturated carboxylic acid having free carboxyl group and has a glass transition temperature of 70° C. or higher, (C) 30 to 120 parts by weight of a liquid polymerizable monomer, (D) a curing agent, and (E) a reinforcing material into a mold and compression molding the bulk molding compound at 40 to 100° C. under 0.1 to 10 kgf/cm$^2$ (gauge pressure) to obtain a molded product.

9. A process for molding an unsaturated polyester resin molding material comprising softening a bulk molding compound comprising (A) 100 parts by weight of an unsaturated polyester resin, (B) 20 to 120 parts by weight of a thickening agent containing, as the effective component thereof, (1) powder of a resin containing 50% by weight or more of at least one type of monomer unit selected from the group consisting of esters of acrylic acid, esters of methacrylic acid, and aromatic vinyl compounds or (2) powder of a copolymer resin prepared by ionically crosslinking particles of a core/shell copolymer by addition of a metal cation, the core/shell copolymer comprising (a) a core which comprises at least one member selected from the group consisting of (i) a polymer of an ester of acrylic acid or an ester of methacrylic acid having a glass transition temperature of −30° C. or lower and (ii) a polymer of a diene having a glass transition temperature of −30° or lower and (b) a shell which comprises a copolymer of (i) a monomer of an ester of acrylic acid or an ester of methacrylic acid and (ii) a monomer of a radical polymerizable unsaturated carboxylic acid having free carboxyl group and has a glass transition temperature of 70° C. or higher, (C) 30 to 120 parts by weight of a liquid polymerizable monomer, (D) a curing agent, (E) a reinforcing material, and (F) less than 100 parts by weight of a inorganic filler in a transfer pot at 50 to 150° C. and molding the softened bulk molding compound by compressing into a cavity heated to 50 to 150° C. under 1 to 20 kgf/cm$^2$ (gauge pressure) to obtain a molded product.

10. A process for molding an unsaturated polyester resin molding material comprising injection molding a bulk molding compound comprising (A) 100 parts by weight of an unsaturated polyester resin, (B) 20 to 120 parts by weight of a thickening agent containing, as the effective component thereof, (1) powder of a resin containing 50% by weight or more of at least one type of monomer unit selected from the group consisting of esters of acrylic acid, esters of methacrylic acid, and aromatic vinyl compounds or (2) powder of a copolymer resin prepared by ionically crosslinking particles of a core/shell copolymer by addition of a metal cation, the core/shell copolymer comprising (a) a core which comprises at least one member selected from the group consisting of (i) a polymer of an ester of acrylic acid or an ester of methacrylic acid having a glass transition temperature of −30° C. or lower and (ii) a polymer of a diene having a glass transition temperature of −30° or lower and (b) a shell which comprises a copolymer of (i) a monomer of an ester of acrylic acid or an ester of methacrylic acid and (ii) a monomer of a radical polymerizable unsaturated carboxylic acid having free carboxyl group and has a glass transition temperature of 70° C. or higher, (C) 30 to 120 parts by weight of a liquid polymerizable monomer, (D) a curing agent, (E) a reinforcing material, and (F) less than 100 parts by weight of a inorganic filler at 50 to 150° C. under 1 to 20 kgf/cm$^2$ (gauge pressure) to obtain a molded product.

11. A process for increasing viscosity of an unsaturated polyester resin composition comprising the step of adding to said composition a thickening agent after applying the composition to a surface for coating, wherein said composition comprises (A) an unsaturated polyester resin, (C) a liquid polymerizable monomer, and (D) a curing agent and wherein said thickening agent comprises, as the effective component thereof, a powder of a thermoplastic resin comprising a powder of a copolymer resin prepared by ionically crosslinking particles of a core/shell copolymer by addition of a metal cation, the core/shell copolymer comprising (a) a core which comprises at least one member selected from the group consisting of (i) a polymer of an ester of acrylic acid or an ester of methacrylic acid having a glass transition temperature of −30° C. or lower and (ii) a polymer of a diene having a glass transition temperature of −30° C. or lower and (b) a shell which comprises a copolymer of (i) a monomer of an ester of acrylic acid or an ester of methacrylic acid and (ii) a monomer of a radical polymerizable unsaturated carboxylic acid having a free carboxyl group and has a glass transition temperature of 70° C. or higher.

12. An unsaturated polyester resin composition for molding comprising (A) 100 parts by weight of an unsaturated polyester resin, (B) 20 to 120 parts by weight of a thickening agent consisting of a powder of a copolymer resin prepared by ionically crosslinking particles of a core/shell copolymer by addition of a metal cation, the core/shell copolymer comprising (a) a core which comprises at least one member selected from the group consisting of (i) a polymer of an ester of acrylic acid or an ester of methacrylic acid having a glass transition temperature of −30° C. or lower and (ii) a polymer of a diene having a glass transition temperature of −30° C. or lower and (b) a shell which comprises a copolymer of (i) a monomer of an ester of acrylic acid or an ester of methacrylic acid and (ii) a monomer of a radical polymerizable unsaturated carboxylic acid having a free carboxyl group and has a glass transition temperature of 70° C. or higher, (C) 30 to 120 parts by weight of a liquid polymerizable monomer, (D) a curing agent, and (F) less than 100 parts by weight of an inorganic filler, wherein said unsaturated polyester resin composition is suitable for molding into a molded product at a temperature of from 40 to 100° C. and under a pressure of from 0.1 to 10 kgf/cm$^2$.

13. An unsaturated polyester resin composition for molding comprising (A) 100 parts by weight of an unsaturated polyester resin, (B) 20 to 120 parts by weight of a thickening agent consisting of a powder of a copolymer resin prepared by ionically crosslinking particles of a core/shell copolymer by addition of a metal cation, the core/shell copolymer comprising (a) a core which comprises at least one member selected from the group consisting of (i) a polymer of an ester of acrylic acid or an ester of methacrylic acid having a glass transition temperature of −30° C. or lower and (ii) a polymer of a diene having a glass transition temperature of −30° C. or lower and (b) a shell which comprises a copolymer of (i) a monomer of an ester of acrylic acid or an ester of methacrylic acid and (ii) a monomer of a radical polymerizable unsaturated carboxylic acid having a free carboxyl group and has a glass transition temperature of 70° C. or higher, (C) 30 to 120 parts by weight of a liquid polymerizable monomer, (D) a curing agent, and (F) less than 100 parts by weight of an inorganic filler, wherein said unsaturated polyester resin composition is suitable for sheet molding or bulk molding into a molded product.

14. A molded product made from an unsaturated polyester resin composition comprising (A) 100 parts by weight of an unsaturated polyester resin, (B) 20 to 120 parts by weight of a thickening agent consisting of a powder of a copolymer resin prepared by ionically crosslinking particles of a core/shell copolymer by addition of a metal cation, the core/shell copolymer comprising (a) a core which comprises at lease one member selected from the group consisting of (i) a polymer of an ester of acrylic acid or an ester of methacrylic acid having a glass transition temperature of −30° C. or lower and (ii) a polymer of a diene having a glass transition temperature of −30° C. or lower and (b) a shell which comprises a copolymer of (i) a monomer of an ester of acrylic acid or an ester of methacrylic acid and (ii) a monomer of a radical polymerizable unsaturated carboxylic acid having a free carboxyl group and has a glass transition temperature of 70° C. or higher, (C) 30 to 120 parts by weight of a liquid polymerizable monomer, (D) a curing agent, and (F) less than 100 parts by weight of an inorganic filler, wherein said unsaturated polyester resin composition is molded into said molded product at a temperature of from 40 to 100° C. and under a pressure of from 0.1 to 10 kgf/cm$^2$.

15. A molded product made from an unsaturated polyester resin composition comprising (A) 100 parts by weight of an unsaturated polyester resin, (B) 20 to 120 parts by weight of a thickening agent consisting of a powder of a copolymer resin prepared by ionically crosslinking particles of a core/shell copolymer by addition of a metal cation, the core/shell copolymer comprising (a) a core which comprises at lease one member selected from the group consisting of (i) a polymer of an ester of acrylic acid or an ester of methacrylic acid having a glass transition temperature of −30° C. or lower and (ii) a polymer of a diene having a glass transition temperature of −30° C. or lower and (b) a shell which comprises a copolymer of (i) a monomer of an ester of acrylic acid or an ester of methacrylic acid and (ii) a monomer of a radical polymerizable unsaturated carboxylic acid having a free carboxyl group and has a glass transition temperature of 70° C. or higher, (C) 30 to 120 parts by weight of a liquid polymerizable monomer, (D) a curing agent, and (F) less than 100 parts by weight of an inorganic filler, wherein said unsaturated polyester resin composition is molded into said molded product by sheet molding or bulk molding.

16. An unsaturated polyester resin composition for molding comprising (A) an unsaturated polyester resin, (B) a thickening agent containing, as the effective component thereof, (1) a powder of a resin containing 50% by weight or more of at least one type of monomer unit selected from the group consisting of esters of acrylic acid, esters of methacrylic acid, and aromatic vinyl compounds or (2) a powder of a copolymer resin prepared by ionically crosslinking particles of a core/shell copolymer by addition of a metal cation, the core/shell copolymer comprising (a) a core which comprises at least one member selected from the group consisting of (i) a polymer of an ester of acrylic acid or an ester of methacrylic acid having a glass transition temperature of −30° C. or lower and (ii) a polymer of a diene having a glass transition temperature of −30° C. or lower and (b) a shell which comprises a copolymer of (i) a monomer of an ester of acrylic acid or an ester of methacrylic acid and (ii) a monomer of a radical polymerizable unsaturated carboxylic acid having a free carboxyl group and having a glass transition temperature of 70° C. or higher, (C) a liquid monomer, (D) a curing agent, and (F) less than 100 parts by weight of an inorganic filler, wherein said unsaturated polyester resin composition is molded into a molded product at a temperature of from 40 to 100° C. and under a pressure of from 0.1 to 10 kgf/cm$^2$.

17. An unsaturated polyester resin composition for molding comprising (A) an unsaturated polyester resin, (B) a thickening agent containing, as the effective component thereof, (1) a powder of a resin containing 50% by weight or more of at least one type of monomer unit selected from the group consisting of esters of acrylic acid, esters of methacrylic acid, and aromatic vinyl compounds or (2) a powder of a copolymer resin prepared by ionically crosslinking particles of a core/shell copolymer by addition of a metal cation, the core/shell copolymer comprising (a) a core which comprises at least one member selected from the group consisting of (i) a polymer of an ester of acrylic acid or an ester of methacrylic acid having a glass transition temperature of −30° C. or lower and (ii) a polymer of a diene having a glass transition temperature of −30° C. or lower and (b) a shell which comprises a copolymer of (i) a monomer of an ester of acrylic acid or an ester of methacrylic acid and (ii) a monomer of a radical polymerizable unsaturated carboxylic acid having a free carboxyl group and having a glass transition temperature of 70° C. or higher, (C) a liquid monomer, (D) a curing agent, and (F) less than 100 parts by weight of an inorganic filler, wherein said unsaturated polyester resin composition is molded into a molded product by sheet molding or bulk molding.

* * * * *

UNITED STATES PATENT AND TRADEMARK OFFICE
CERTIFICATE OF CORRECTION

PATENT NO. : 5,972,272
DATED : October 26, 1999
INVENTOR(S) : NAGASE et al.

It is certified that error appears in the above-identified patent and that said Letters Patent is hereby corrected as shown below:

claim 1  column 36 on line 35, change "-30°" to be -- -30°C--.

claim 2  column 36 on line 64, change "-30°" to be -- -30°C--.

claim 3  column 37 on line 23, change "-30°" to be -- -30°C--.

claim 4  column 37 on line 52, change "-30°" to be -- -30°C--.

claim 5  column 38 on line 15, change "-30°" to be -- -30°C--.

claim 6  column 38 on line 42, change "-30°" to be -- -30°C--.

claim 7  column 39 on line 4, change "-30°" to be -- -30°C--.

claim 8  column 39 on line 34, change "-30°" to be -- -30°C--.

claim 9  column 39 on line 61, change "-30°" to be -- -30°C--.

claim 10  column 40 on line 22, change "-30°" to be -- -30°C--.

Signed and Sealed this

Seventh Day of November, 2000

*Attest:*

Q. TODD DICKINSON

*Attesting Officer*    *Director of Patents and Trademarks*